US010876490B2

(12) United States Patent
Takemoto et al.

(10) Patent No.: US 10,876,490 B2
(45) Date of Patent: Dec. 29, 2020

(54) ENGINE CONTROL DEVICE, ENGINE CONTROL METHOD, AND ENGINE SYSTEM

(71) Applicant: Mazda Motor Corporation, Hiroshima (JP)

(72) Inventors: Kazuhiro Takemoto, Hiroshima (JP); Michio Ito, Hatsukaichi (JP); Masanari Sueoka, Hiroshima (JP); Kazuhiro Nishimura, Higashihiroshima (JP); Kouji Hadama, Hiroshima (JP); Masataka Sumita, Aki-gun (JP); Masami Nishida, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/811,199

(22) Filed: Mar. 6, 2020

(65) Prior Publication Data

US 2020/0370499 A1 Nov. 26, 2020

(30) Foreign Application Priority Data

May 20, 2019 (JP) .................................. 2019-094274

(51) Int. Cl.
*F02D 41/38* (2006.01)
*F02D 41/14* (2006.01)

(52) U.S. Cl.
CPC ..... *F02D 41/3836* (2013.01); *F02D 41/1475* (2013.01); *F02D 2200/06* (2013.01); *F02D 2250/31* (2013.01)

(58) Field of Classification Search
CPC ............. F02D 41/3836; F02D 41/1475; F02D 2250/31; F02D 2200/06
See application file for complete search history.

(56) References Cited

U.S. PATENT DOCUMENTS

| 7,017,555 | B2 * | 3/2006 | Heinstein | ................ F02B 77/04 123/447 |
| 9,797,358 | B2 * | 10/2017 | Li | .......................... F02D 41/402 |
| 10,161,350 | B2 * | 12/2018 | Kitazume | ............. F02D 41/402 |
| 2010/0070158 | A1 * | 3/2010 | Futonagane | ........... F02M 45/02 701/105 |
| 2018/0099656 | A1 * | 4/2018 | Otsuka | .................. B60W 20/40 |
| 2018/0171956 | A1 * | 6/2018 | Dileon | ................. F02M 65/008 |

FOREIGN PATENT DOCUMENTS

JP 2018062923 A 4/2018

\* cited by examiner

*Primary Examiner* — Carl C Staubach
(74) *Attorney, Agent, or Firm* — Alleman Hall Creasman & Tuttle LLP

(57) ABSTRACT

A controller for controlling a fuel injection valve and a fuel pressure adjustment mechanism sets an air-fuel ratio of a fuel-air mixture to be generated within a combustion chamber to be equal to or leaner than a theoretical air-fuel ratio, based on an operating condition of an engine; drives the fuel injection valve, based on the set air-fuel ratio; estimates a deposition amount of deposits on an injection hole of the fuel injection valve, based on an operating condition of the engine; causes the fuel pressure adjustment mechanism to increase the fuel pressure, when the estimated deposition amount of deposits exceeds a predetermined value; and restricts the fuel pressure from increasing, even when the estimated deposition amount of deposits exceeds the predetermined value, as long as the fuel-air ratio is set to an air-fuel ratio leaner than the theoretical fuel-air ratio.

6 Claims, 10 Drawing Sheets

FIG.6

[SPCCI_λ=1, SI] BASIC FUEL PRESSURE MAP

| LOAD/ROTATION SPEED | 500 | 750 | 1000 | 1250 | 1500 | 1750 | 2000 | 2250 | 2500 | 2750 | 3000 | 3250 | 3500 | 3750 | 4000 | 4500 | 5000 | 5500 | 6000 | 6500 |
|---|---|---|---|---|---|---|---|---|---|---|---|---|---|---|---|---|---|---|---|---|
| 0.125 | 40 | 40 | 40 | 40 | 40 | 40 | 40 | 40 | 40 | 40 | 40 | 60 | 60 | 60 | 60 | 60 | 60 | 60 | 60 | 60 |
| 0.15  | 40 | 40 | 40 | 40 | 40 | 40 | 40 | 40 | 40 | 40 | 40 | 60 | 60 | 60 | 60 | 60 | 60 | 60 | 60 | 60 |
| 0.2   | 40 | 40 | 40 | 40 | 40 | 40 | 40 | 40 | 40 | 40 | 40 | 60 | 60 | 60 | 60 | 60 | 60 | 60 | 60 | 60 |
| 0.25  | 40 | 40 | 40 | 40 | 40 | 40 | 40 | 40 | 40 | 40 | 40 | 60 | 60 | 60 | 60 | 60 | 60 | 60 | 60 | 60 |
| 0.3   | 40 | 40 | 40 | 40 | 40 | 40 | 40 | 40 | 40 | 40 | 40 | 60 | 60 | 60 | 60 | 60 | 60 | 60 | 60 | 60 |
| 0.35  | 40 | 40 | 40 | 40 | 40 | 40 | 40 | 40 | 40 | 40 | 60 | 60 | 60 | 60 | 60 | 60 | 60 | 60 | 60 | 60 |
| 0.4   | 40 | 40 | 40 | 40 | 40 | 40 | 40 | 40 | 40 | 60 | 60 | 60 | 60 | 60 | 60 | 60 | 60 | 60 | 60 | 60 |
| 0.45  | 40 | 40 | 40 | 40 | 40 | 40 | 60 | 60 | 60 | 60 | 60 | 60 | 60 | 60 | 40 | 40 | 40 | 40 | 40 | 40 |
| 0.5   | 30 | 30 | 60 | 60 | 60 | 60 | 60 | 60 | 60 | 60 | 60 | 40 | 40 | 40 | 40 | 40 | 40 | 40 | 40 | 40 |
| 0.55  | 30 | 30 | 30 | 60 | 60 | 60 | 60 | 60 | 60 | 60 | 40 | 40 | 40 | 40 | 40 | 40 | 40 | 40 | 40 | 40 |
| 0.6   | 30 | 30 | 30 | 30 | 30 | 60 | 60 | 60 | 60 | 30 | 40 | 40 | 40 | 40 | 40 | 40 | 40 | 40 | 40 | 40 |
| 0.65  | 30 | 30 | 30 | 30 | 30 | 30 | 30 | 60 | 60 | 30 | 40 | 40 | 40 | 40 | 40 | 40 | 40 | 40 | 40 | 40 |
| 0.7   | 30 | 30 | 30 | 30 | 30 | 30 | 30 | 30 | 30 | 30 | 40 | 40 | 40 | 40 | 40 | 40 | 40 | 40 | 40 | 40 |
| 0.8   | 30 | 30 | 30 | 30 | 30 | 30 | 30 | 30 | 30 | 30 | 40 | 40 | 40 | 40 | 40 | 40 | 40 | 40 | 40 | 40 |
| 0.9   | 30 | 30 | 30 | 30 | 30 | 30 | 30 | 30 | 30 | 30 |    | 40 | 40 | 40 | 40 | 40 | 40 | 40 | 40 | 40 |
| 1     | 30 | 30 | 30 | 30 | 30 | 30 | 30 | 30 | 30 | 30 |    |    |    |    |    |    |    |    |    |    |
| 1.1   | 30 | 30 | 30 | 30 | 30 | 30 | 30 | 30 | 30 | 30 |    |    |    |    |    |    |    |    |    |    |
| 1.2   | 30 | 30 | 30 | 30 | 30 | 30 | 30 | 30 | 30 | 30 |    |    |    |    |    |    |    |    |    |    |
| 1.3   | 30 | 30 | 30 | 30 | 30 | 30 | 30 | 30 | 30 | 30 |    |    |    |    |    |    |    |    |    |    |
| 1.4   | 30 | 30 | 30 | 30 | 30 | 30 | 30 | 30 | 30 | 30 |    |    |    |    |    |    |    |    |    |    |

FIG.7

[SPCCI_λ＞1] BASIC FUEL PRESSURE MAP

| INJECTION AMOUNT /ROTATION SPEED | 750 | 1000 | 1250 | 1500 | 1750 | 2000 | 2250 | 2500 | 2750 | 3000 |
|---|---|---|---|---|---|---|---|---|---|---|
| 4.5 | 40 | 40 | 40 | 40 | 40 | 40 | 40 | 40 | 40 | 40 |
| 6.5 | 40 | 40 | 40 | 40 | 40 | 40 | 40 | 40 | 40 | 40 |
| 8.5 | 40 | 40 | 40 | 40 | 40 | 40 | 40 | 40 | 40 | 40 |
| 10.5 | 40 | 40 | 40 | 40 | 40 | 40 | 40 | 40 | 40 | 40 |
| 12.5 | 40 | 40 | 40 | 40 | 40 | 40 | 40 | 40 | 40 | 40 |
| 14.5 | 40 | 40 | 40 | 40 | 40 | 40 | 40 | 40 | 40 | 40 |
| 15.5 | 40 | 40 | 40 | 40 | 40 | 40 | 40 | 40 | 40 | 40 |
| 16.5 | 40 | 40 | 40 | 40 | 40 | 40 | 40 | 40 | 40 | 40 |
| 18.5 | 40 | 40 | 40 | 40 | 40 | 40 | 40 | 40 | 40 | 40 |
| 20.5 | 40 | 40 | 40 | 40 | 40 | 40 | 40 | 40 | 40 | 40 |

FIG.8

[SPCCI_λ=1, SI] FUEL PRESSURE MAP FOR DEPOSITION REMOVAL

| LOAD/ROTATION SPEED | 500 | 750 | 1000 | 1250 | 1500 | 1750 | 2000 | 2250 | 2500 | 2750 | 3000 | 3250 | 3500 | 3750 | 4000 | 4500 | 5000 | 5500 | 6000 | 6500 |
|---|---|---|---|---|---|---|---|---|---|---|---|---|---|---|---|---|---|---|---|---|
| 0.125 | 60 | 60 | 60 | 60 | 60 | 60 | 60 | 60 | 60 | 60 | 60 | 60 | 60 | 60 | 60 | 60 | 60 | 60 | 60 | 60 |
| 0.15 | 60 | 60 | 60 | 60 | 60 | 60 | 60 | 60 | 60 | 60 | 60 | 60 | 60 | 60 | 60 | 60 | 60 | 60 | 60 | 60 |
| 0.2 | 60 | 60 | 60 | 60 | 60 | 60 | 60 | 60 | 60 | 60 | 60 | 60 | 60 | 60 | 60 | 60 | 60 | 60 | 60 | 60 |
| 0.25 | 60 | 60 | 60 | 60 | 60 | 60 | 60 | 60 | 60 | 60 | 60 | 60 | 60 | 60 | 60 | 60 | 60 | 60 | 60 | 60 |
| 0.3 | 60 | 60 | 60 | 60 | 60 | 60 | 60 | 60 | 60 | 60 | 60 | 60 | 60 | 60 | 60 | 60 | 60 | 60 | 60 | 60 |
| 0.35 | 60 | 60 | 60 | 60 | 60 | 60 | 60 | 60 | 60 | 60 | 60 | 60 | 60 | 60 | 60 | 60 | 60 | 60 | 60 | 60 |
| 0.4 | 60 | 60 | 60 | 60 | 60 | 60 | 60 | 60 | 60 | 60 | 60 | 60 | 60 | 60 | 60 | 60 | 60 | 60 | 60 | 60 |
| 0.45 | 60 | 60 | 60 | 60 | 60 | 60 | 60 | 60 | 60 | 60 | 60 | 60 | 60 | 60 | 60 | 60 | 60 | 60 | 60 | 60 |
| 0.5 | 30 | 30 | 60 | 60 | 60 | 60 | 60 | 60 | 60 | 60 | 40 | 40 | 40 | 40 | 40 | 40 | 40 | 40 | 40 | 40 |
| 0.55 | 30 | 30 | 60 | 60 | 60 | 60 | 60 | 60 | 60 | 60 | 40 | 40 | 40 | 40 | 40 | 40 | 40 | 40 | 40 | 40 |
| 0.6 | 30 | 30 | 30 | 60 | 60 | 60 | 60 | 60 | 60 | 60 | 40 | 40 | 40 | 40 | 40 | 40 | 40 | 40 | 40 | 40 |
| 0.65 | 30 | 30 | 30 | 30 | 60 | 60 | 60 | 60 | 60 | 60 | 40 | 40 | 40 | 40 | 40 | 40 | 40 | 40 | 40 | 40 |
| 0.7 | 30 | 30 | 30 | 30 | 30 | 60 | 60 | 60 | 60 | 60 | 40 | 40 | 40 | 40 | 40 | 40 | 40 | 40 | 40 | 40 |
| 0.8 | 30 | 30 | 30 | 30 | 30 | 30 | 60 | 60 | 60 | 60 | 40 | 40 | 40 | 40 | 40 | 40 | 40 | 40 | 40 | 40 |
| 0.9 | 30 | 30 | 30 | 30 | 30 | 30 | 30 | 60 | 60 | 60 | 40 | 40 | 40 | 40 | 40 | 40 | 40 | 40 | 40 | 40 |
| 1 | 30 | 30 | 30 | 30 | 30 | 30 | 30 | 30 | 60 | 60 | 40 | 40 | 40 | 40 | 40 | 40 | 40 | 40 | 40 | 40 |
| 1.1 | 30 | 30 | 30 | 30 | 30 | 30 | 30 | 30 | 30 | 60 | 40 | 40 | 40 | 40 | 40 | 40 | 40 | 40 | 40 | 40 |
| 1.2 | 30 | 30 | 30 | 30 | 30 | 30 | 30 | 30 | 30 | 30 | 40 | 40 | 40 | 40 | 40 | 40 | 40 | 40 | 40 | 40 |
| 1.3 | 30 | 30 | 30 | 30 | 30 | 30 | 30 | 30 | 30 | 30 | 40 | 40 | 40 | 40 | 40 | 40 | 40 | 40 | 40 | 40 |
| 1.4 | 30 | 30 | 30 | 30 | 30 | 30 | 30 | 30 | 30 | 30 | 40 | 40 | 40 | 40 | 40 | 40 | 40 | 40 | 40 | 40 |

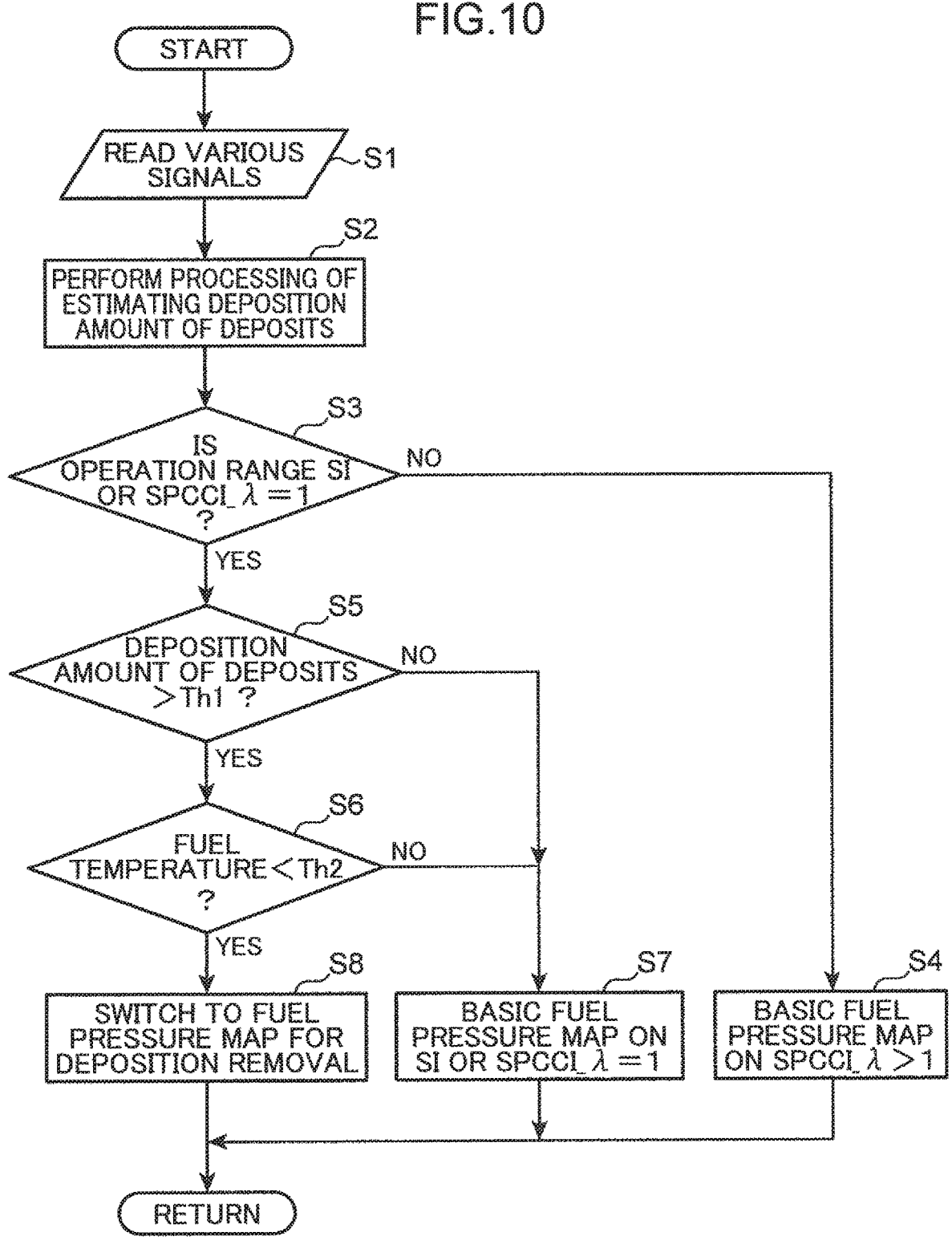

ENGINE CONTROL DEVICE, ENGINE CONTROL METHOD, AND ENGINE SYSTEM

CROSS-REFERENCE TO RELATED APPLICATION

This application is based on Japanese Patent application No. 2019-094274 filed in Japan Patent Office on May 20, 2019, the contents of which are hereby incorporated by reference.

TECHNICAL FIELD

The present invention relates to a control device and a control method for an engine including a fuel injection valve for directly injecting fuel toward a cavity of a piston, and an engine system to which the control device and the control method are applied.

BACKGROUND

In a direct-injection engine, a fuel injection valve is disposed in such a way that an injection hole is exposed in a ceiling surface of a combustion chamber, for example. In this case, deposits (carbon) may adhere to the injection hole, and fuel injection performance of the injection hole may be lowered. One of the factors of generation of the deposits is that injected fuel adheres to the vicinity of the injection hole, and the fuel is solidified by combustion within the combustion chamber. Japanese Unexamined Patent Application Publication No. 2018-62923 discloses a technique of performing cleaning control in which a fuel pressure of a fuel injection valve is increased in order to remove deposits adhered to the vicinity of an injection hole.

A fuel injection valve (injector) currently in general use is driven by applying pulse-controlled electric current to an internal coil for operating a valve body. A fuel injection amount from an injection hole is adjusted by a pulse width of a control pulse (ON period during which an injection hole is opened). Specifically, as the pulse width (duty ratio) increases, a fuel injection amount increases.

A fuel pressure increase is advantageous in removing the deposits. However, it is revealed that increasing a fuel pressure, when an air-fuel ratio of a fuel-air mixture to be generated in a combustion chamber is set leaner than a theoretical air-fuel ratio, is unable to secure a fuel-air mixture distribution within a cylinder as intended, and combustion stability is lowered. Specifically, when lean combustion is performed, since a fuel injection amount is small, the pulse width is set small. However, in order to increase a fuel pressure, it is necessary to shorten an opening period of the injection hole by decreasing a pulse width, which is originally small. This is because an injection amount per unit time increases by a fuel pressure increase. In a range in which the pulse width is too small, linearity of a fuel injection amount of a fuel injection valve may not be secured. In other words, fluctuation with respect to a target injection amount occurs, and consequently, a phenomenon such that an intended fuel-air mixture distribution is not secured within a cylinder.

SUMMARY

An object of the present invention is to provide an engine control device and an engine control method capable of accurately removing deposits from an injection hole of a fuel injection valve, and securing combustion stability; and an engine system to which the engine control device and the engine control method are applied.

An engine control device according to one aspect of the present invention is a control device for an engine provided with a fuel injection valve disposed within a combustion chamber, a part of which is defined by a piston including a cavity in a crown surface thereof, and configured to directly inject fuel toward the cavity. The control device includes: a fuel pressure adjustment mechanism for adjusting a fuel pressure of fuel to be supplied to the fuel injection valve; and a controller for controlling the fuel injection valve and the fuel pressure adjustment mechanism, and constituted of a circuitry. The controller is configured to: set an air-fuel ratio of a fuel-air mixture to be generated within the combustion chamber to an air-fuel ratio equal to or leaner than a theoretical air-fuel ratio, based on an operating condition of the engine; output a control signal to the fuel injection valve in such a way as to drive the fuel injection valve, based on the set air-fuel ratio; perform processing of estimating a deposition amount of deposits on an injection hole of the fuel injection valve, based on an operating condition of the engine; output a control signal to the fuel pressure adjustment mechanism in such a way as to increase the fuel pressure, when the estimated deposition amount of deposits exceeds a predetermined value; and restrict the fuel pressure from increasing, even when the estimated deposition amount of deposits exceeds the predetermined value, as long as the set air-fuel ratio is set to an air-fuel ratio leaner than the theoretical air-fuel ratio.

An engine system according to another aspect of the present invention includes: an engine body including a combustion chamber, a part of which is defined by a piston including a cavity in a crown surface thereof, and a fuel injection valve disposed within the combustion chamber and configured to directly inject fuel toward the cavity; and the above-described control device. A head portion of the fuel injection valve in which the injection hole is formed is disposed on a ceiling surface of the combustion chamber in such a way as to face the cavity in a vicinity of a radial center of the combustion chamber.

An engine control method according to yet another aspect of the present invention is a control method for an engine provided with a combustion chamber, a part of which is defined by a piston including a cavity in a crown surface thereof, a fuel injection valve for directly injecting fuel toward the cavity, and a fuel pressure adjustment mechanism for adjusting a fuel pressure of fuel to be supplied to the fuel injection valve. The control method includes: setting an air-fuel ratio of a fuel-air mixture to be generated within the combustion chamber to an air-fuel ratio equal to or leaner than a theoretical air-fuel ratio, based on an operating condition of the engine; driving the fuel injection valve, based on the set air-fuel ratio; estimating a deposition amount of deposits on an injection hole of the fuel injection valve, based on an operating condition of the engine; causing the fuel pressure adjustment mechanism to increase the fuel pressure, when the estimated deposition amount of deposits exceeds a predetermined value; and restricting the fuel pressure from increasing, even when the estimated deposition amount of deposits exceeds the predetermined value, as long as the set air-fuel ratio is set to an air-fuel ratio leaner than the theoretical air-fuel ratio.

BRIEF DESCRIPTION OF DRAWINGS

FIG. 6 is one example of a basic fuel pressure map for use in setting a fuel pressure of an injector, when SI combustion and SPCCI_$\lambda$=1 combustion are performed.

FIG. 7 is one example of a basic fuel pressure map for use in setting a fuel pressure of the injector, when SPCCI_$\lambda$>1 combustion is performed.

FIG. 8 is one example of a deposition removal map for use in performing a cleaning mode of the injector, when SI combustion and SPCCI_$\lambda$=1 combustion are performed.

FIG. 10 is a flowchart illustrating one example of fuel pressure switching control of the injector.

DETAILED DESCRIPTION

[Overall Configuration of Engine]

Figure 1:
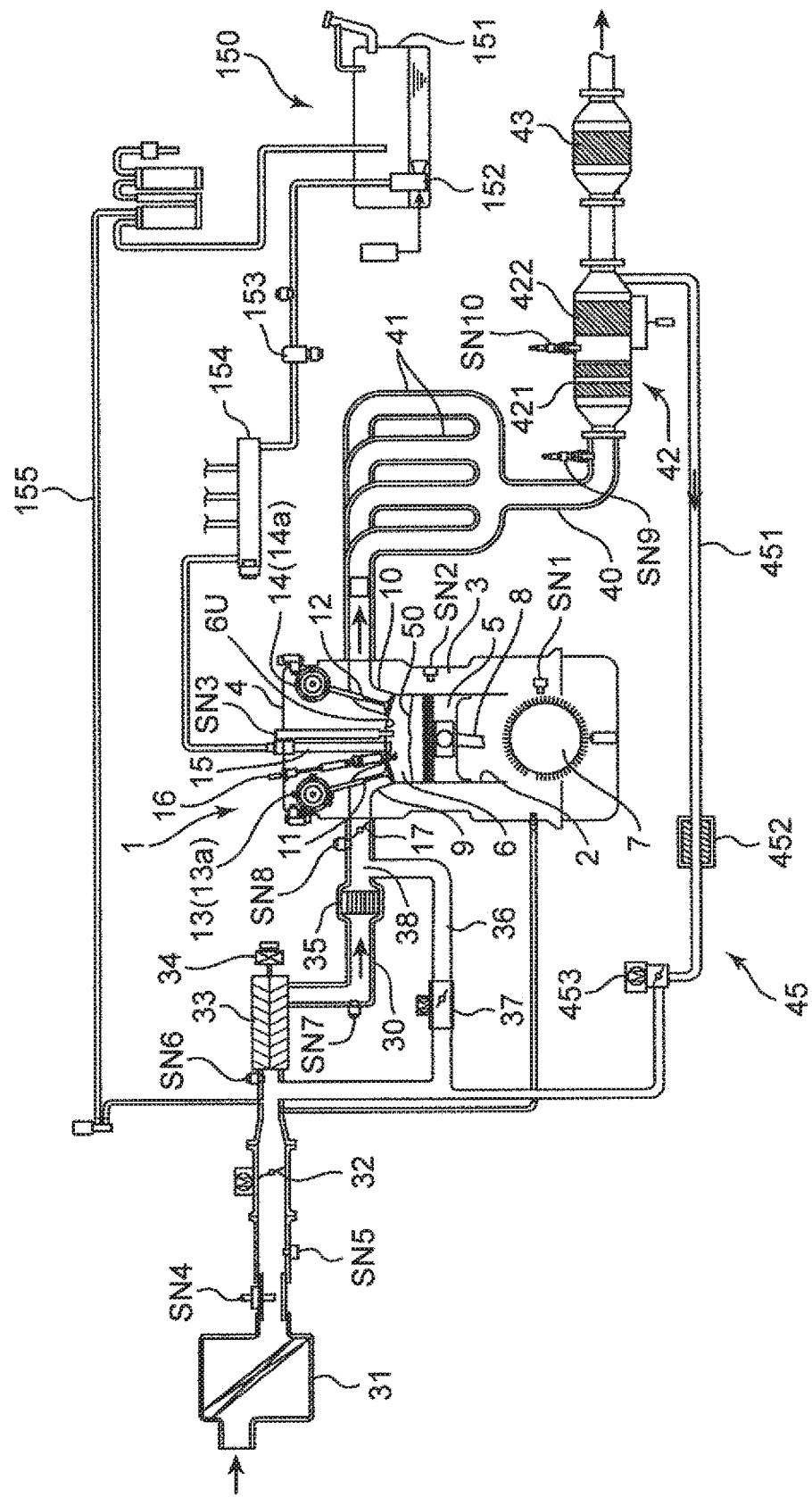
FIG. 1 is a diagram illustrating an overall configuration of an engine system to which an engine control device according to the present invention is applied.

In the following, an embodiment according to the present invention is described in detail with reference to the drawings. First, an overall configuration of an engine system to which an engine control device and an engine control method according to the present invention are applied is described with reference to a system diagram illustrated in FIG. 1. An engine illustrated in FIG. 1 is a 4-cycle gasoline direct-injection engine to be mounted in a vehicle, as a power source for driving the vehicle. The engine includes an engine body 1, an intake passage 30 through which intake air to be introduced to the engine body 1 flows, an exhaust passage 40 through which exhaust gas to be discharged from the engine body 1 flows, an external EGR device 45 for allowing a part of exhaust gas flowing through the exhaust passage 40 to return to the intake passage 30, and a fuel supply system 150 for supplying, to the engine body 1, fuel containing gasoline as a main component.

Figure 2:
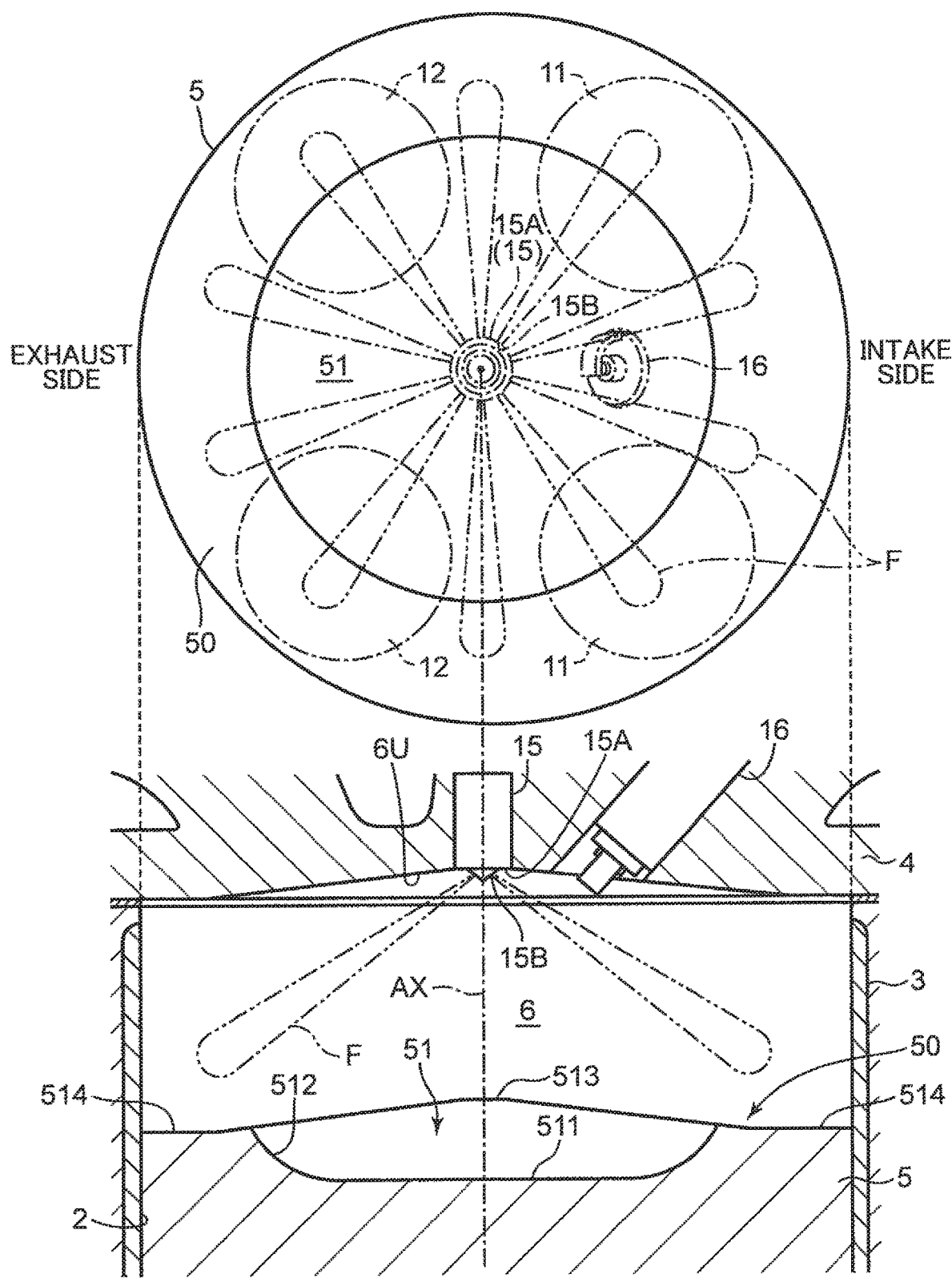
FIG. 2 is a diagram illustrating a cross-sectional view of an engine body, and a plan view of a piston in combination.
Figure 3:
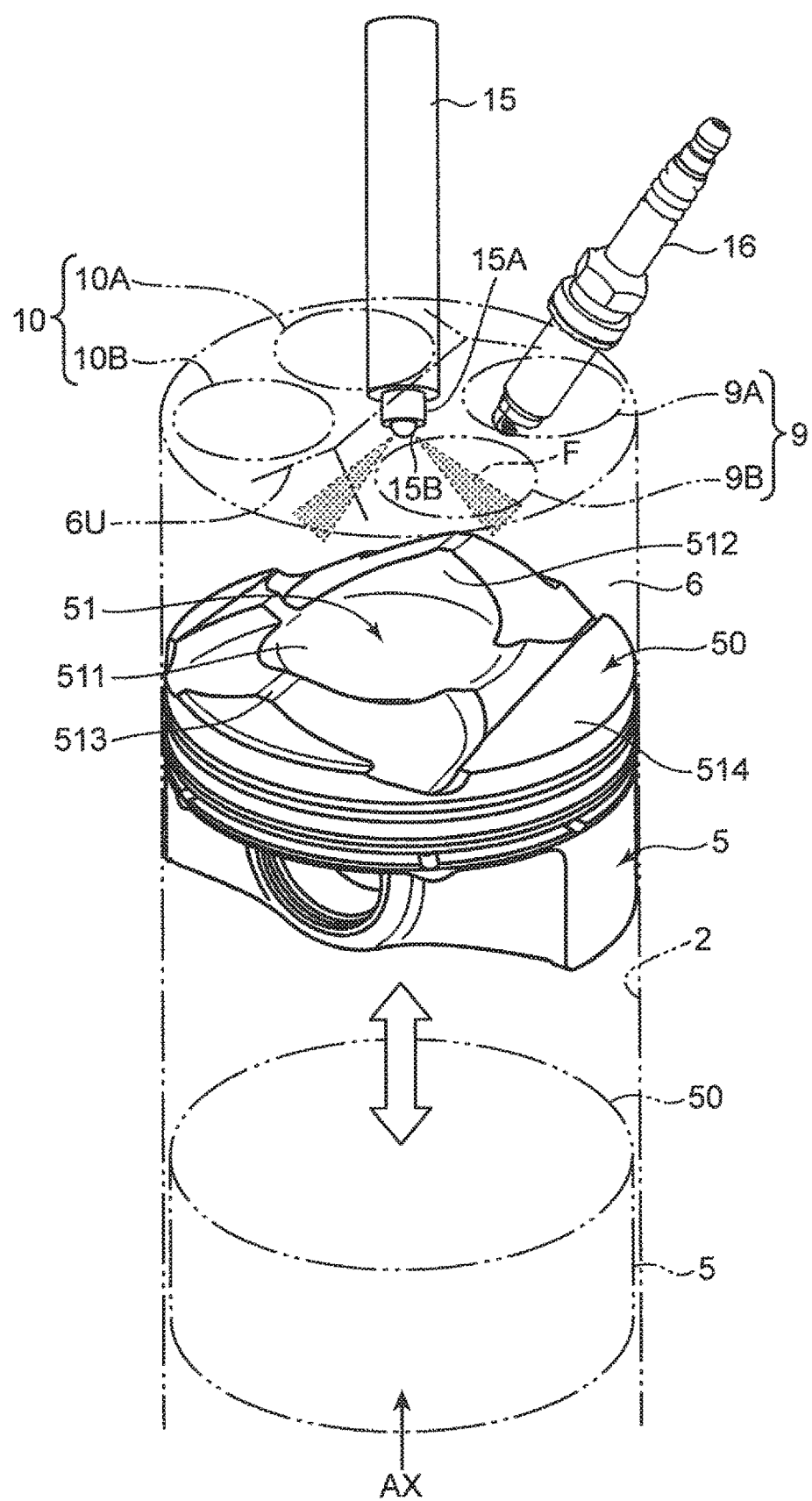
FIG. 3 is a schematic perspective view of one cylinder included in the engine.

The engine body 1 includes a cylinder block 3 in which cylinders 2 are internally formed, a cylinder head 4 mounted on an upper surface of the cylinder block 3 in such a way as to close the cylinders 2 from above, and a piston 5 accommodated within each of the cylinders 2. The engine body 1 is typically of a multi-cylinder type in which a plurality of (e.g. four) cylinders are provided. For simplification, FIG. 1 illustrates only one cylinder 2. FIG. 2 illustrates a cross-sectional view of the engine body 1, and a plan view of the piston 5 in combination. Further, FIG. 3 is a schematic perspective view of one cylinder 2. The piston 5 has an outer diameter according to a bore diameter of the cylinder 2, and is accommodated within the cylinder 2 in such a way as to be reciprocally and slidably movable at a predetermined stroke. A crankshaft 7 being an output shaft of the engine body 1 is provided below the piston 5. The crankshaft 7 is connected to the piston 5 via a connecting rod 8, and is driven to rotate around an axis thereof, as the piston 5 reciprocally moves.

A combustion chamber 6 is defined above the piston 5. The fuel is supplied to the combustion chamber 6 by injection from an injector 15 to be described later. The supplied fuel is mixed with air within the combustion chamber 6 for combustion, and the piston 5 pushed downwardly by an expansion force by the combustion reciprocally moves up and down. A combustion chamber wall surface for defining the combustion chamber 6 is constituted of an inner wall surface of the cylinder 2, a crown surface 50 being an upper surface of the piston 5, and a combustion chamber ceiling surface 6U (including each of valve surfaces of an intake valve 11 and an exhaust valve 12) being a bottom surface of the cylinder head 4. The combustion chamber ceiling surface 6U has an upwardly protruding pent-roof shape.

A geometric compression ratio of the cylinder 2, namely, a ratio between a volume of the combustion chamber 6 when the piston 5 is at a top dead center, and a volume of the combustion chamber 6 when the piston 5 is at a bottom dead center, is set, as a preferable value for SPCCI combustion (partial compression ignition combustion) to be described later, to a high compression ratio of not smaller than 15 but not larger than 30, and more preferably, not smaller than 15 but not larger than 18. Setting the geometric compression ratio to a high compression ratio of not smaller than 15 enables to provide an environment in which a fuel-air mixture is easily compression ignited within the combustion chamber 6.

A crank angle sensor SN1 and a water temperature sensor SN2 are mounted on the cylinder block 3. The crank angle sensor SN1 detects a rotational angle (crank angle) of the crankshaft 7, and a rotation speed of the crankshaft 7 (engine rotation speed). The water temperature sensor SN2 detects a temperature (engine water temperature) of cooling water flowing through the cylinder block 3 and the cylinder head 4.

An intake port 9 and an exhaust port 10 opened toward the combustion chamber 6, the intake valve 11 for opening and closing the intake port 9, and the exhaust valve 12 for opening and closing the exhaust port 10 are provided on the combustion chamber ceiling surface 6U of the cylinder head 4. As illustrated in FIGS. 2 and 3, a valve type of the engine according to the present embodiment is a 4 valve type constituted of two intake valves and two exhaust valves. The intake port 9 includes a first intake port 9A and a second intake port 9B. The exhaust port 10 includes a first exhaust port 10A and a second exhaust port 10B. The intake valve 11 is provided each for the first intake port 9A and the second intake port 9B. The exhaust valve 12 is provided each for the first exhaust port 10A and the second exhaust port 10B. A swirl valve 17 capable of opening and closing the second intake port 9B is provided in the second intake port 9B out of the first and second intake ports 9A and 9B (FIG. 1)

The intake valve 11 and the exhaust valve 12 are driven to open and close in association with rotation of the crankshaft 7 by dynamic valve mechanisms 13 and 14 including a pair of camshafts and the like, which are disposed in the cylinder head 4. An intake VVT 13a capable of changing an opening/closing timing of the intake valve 11 is provided in the dynamic valve mechanism 13 for the intake valve 11. An exhaust VVT 14a capable of changing an opening/closing timing of the exhaust valve 12 is provided in the dynamic valve mechanism 14 for the exhaust valve 12. The intake VVT 13a and the exhaust VVT 14a are so-called phase-type variable mechanisms, and change opening timings and closing timings of the intake valve 11 and the exhaust valve 12 simultaneously and by a same amount.

The injector 15 (fuel injection valve) and a spark plug 16 are mounted on the cylinder head 4. The injector 15 directly injects fuel to be supplied from the fuel supply system 150 into the combustion chamber 6. The spark plug 16 ignites fuel-air mixture in which fuel injected from the injector 15 into the combustion chamber 6, and air introduced into the combustion chamber 6 through the intake port 9 (9A and 9B) are mixed. Further, a cylinder pressure sensor SN3 for detecting a pressure (cylinder pressure) of the combustion chamber 6 is provided in the cylinder head 4. As illustrated in FIG. 2, the injector 15 is disposed in such a way that a head portion 15A at a distal end of the injector 15 is exposed in the vicinity of a radial center of the combustion chamber ceiling surface 6U, and in the vicinity of a top portion of a pent-roof portion of the combustion chamber ceiling surface 6U. Further, the spark plug 16 is disposed in such a way that a distal end (electrode portion) of the spark plug 16 is exposed on a slope portion of the pent-roof portion of the combustion chamber ceiling surface 6U, and between the paired intake ports 9A and 9B.

The injector 15 is a multi-injection-hole type injector in which a plurality of injection holes 15B are formed in the head portion 15A. The injector 15 is able to radially inject fuel from the injection holes 15B. An area indicated by the symbol F in FIG. 2 illustrates a spray of fuel injected from each injection hole 15B. A cavity 51 formed by indenting a radially middle area of the crown surface 50 of the piston 5 to a side opposite to the cylinder head 4 (downwardly) is formed in the crown surface 50 of the piston 5. The head portion 15A of the injector 15 is disposed on the combustion chamber ceiling surface 6U in such a way as to face the cavity 51 in the vicinity of a radial center of the combustion chamber 6. Fuel is directly injected from the injection holes 15B toward the cavity 51.

Deposits may be deposited on the injection holes 15B. The deposits are generated by adhesion of injected fuel to the vicinities of the injection holes 15B, and solidification of the adhered fuel by combustion within the combustion chamber 6. When the injection holes 15B are clogged or openings of the injection holes 15B are narrowed by deposition of deposits, a desired amount of fuel amount may not be supplied to the combustion chamber 6, and a combustion state may be deteriorated. In the present embodiment, a deposition amount of deposits on the injection holes 15B is estimated based on an operating condition of the engine, and when the deposition amount of deposits exceeds a predetermined value, a cleaning mode of removing the deposits by increasing a fuel pressure of fuel to be injected from the injection holes 15B is performed. This point will be described later in detail.

As illustrated in FIG. 2, the cavity of the piston 5 includes a bottom portion 511 constituted of a substantially flat surface, and a side wall 512 curved upwardly from a lateral edge of the bottom portion 511 and rising upwardly. A ridge portion 513 protruding upwardly in association with a pent-roof shape of the combustion chamber ceiling surface 6U, and a squish portion 514 constituted of a semi-circular flat surface are formed on a radially outer side of the crown surface 50 with respect to the cavity 51 (FIG. 3).

The fuel supply system 150 for supplying fuel to the injector 15 includes a fuel tank 151, a low pressure fuel pump 152, a high pressure fuel pump 153 (fuel pressure adjustment mechanism), a fuel rail 154, and a purge passage 155. The fuel tank 151 is a tank for storing fuel. The low pressure fuel pump 152 is an in-tank type pump. The low pressure fuel pump 152 pumps up fuel from the fuel tank 151, and feeds the fuel to the high pressure fuel pump 153. The high pressure fuel pump 153 is a reciprocating type pump. The high pressure fuel pump 153 increases a fuel pressure of fuel fed from the low pressure fuel pump 152, and supplies the fuel to the fuel rail 154. The fuel rail 154 distributes fuel to the injector 15, which is provided in each of the cylinders 2. The purge passage 155 is a passage for recovering fuel gasified within the fuel tank 151, and introducing the gasified fuel to the intake passage 30 for combustion.

The high pressure fuel pump 153 functions as a mechanism for adjusting a fuel pressure of fuel to be supplied to the injector 15. The high pressure fuel pump 153 includes a plunger, and an electromagnetic valve for fuel pressure adjustment. The plunger is driven when coming into contact with a pump cam, which is mounted on a camshaft for driving the exhaust valve 12, and increases a fuel pressure. The electromagnetic valve is a valve for adjusting a fuel pressure of fuel to be supplied to the injector 15 in such a way that the fuel pressure coincides with a set value.

The intake passage 30 is connected to one side surface of the cylinder head 4 in such a way as to communicate with the intake port 9. Air (fresh air) drawn from an upstream end of the intake passage 30 is introduced to the combustion chamber 6 through the intake passage 30 and the intake port 9. An air cleaner 31 for removing foreign matter within intake air, a throttle valve 32 which is openable and closable to adjust a flow rate of intake air, a supercharger 33 for feeding intake air, while compressing the intake air, and an intercooler 35 for cooling intake air compressed by the supercharger 33 are provided in this order in the intake passage 30 from an upstream side of the intake passage 30.

An airflow sensor SN4 for detecting a flow rate of intake air, first and second intake air temperature sensors SN5 and SN7 for detecting a temperature of intake air, and first and second intake air pressure sensors SN6 and SN8 for detecting a pressure of intake air are provided at appropriate positions in the intake passage 30. The airflow sensor SN4 and the first intake air temperature sensor SN5 are provided at a portion between the air cleaner 31 and the throttle valve 32 in the intake passage 30, and detect a flow rate and a temperature of intake air passing through the portion. The first intake air pressure sensor SN6 is provided between the throttle valve 32 and the supercharger 33 in the intake passage 30, and at a downstream portion with respect to a connection port of an EGR passage 451 to be described later, and detects a pressure of intake air passing through the portion. The second intake air temperature sensor SN7 is provided at a portion between the supercharger 33 and the intercooler 35 in the intake passage 30, and detects a temperature of intake air passing through the portion. The second intake air pressure sensor SN8 detects a pressure of intake air at a portion between the intercooler 35 and the intake port 9 in the intake passage 30.

The supercharger 33 is a mechanical supercharger mechanically interconnected to the engine body 1. An electromagnetic clutch 34 capable of electrically switching engagement and disengagement is mounted on the supercharger 33. When the electromagnetic clutch 34 is engaged, a driving force is transmitted from the engine body 1 to the supercharger 33, whereby supercharging of intake air by the supercharger 33 is performed. On the other hand, when the electromagnetic clutch 34 is disengaged, transmission of the driving force is blocked, whereby the supercharging by the supercharger 33 is stopped.

A bypass passage 36 for bypassing the supercharger 33 to allow intake air to flow is provided in the intake passage 30. A bypass valve 37 capable of opening and closing the bypass passage 36 is provided in the bypass passage 36. The bypass passage 36 includes a merging portion 38, which is branched from the intake passage 30 on an upstream side with respect to the supercharger 33, and merges the intake passage 30 on a downstream side of the intercooler 35. The merging portion 38 is disposed near an unillustrated surge tank. The bypass passage 36 also serves as a passage for connecting the EGR passage 451 to be described later, and the surge tank.

The exhaust passage 40 communicates with the exhaust port 10 of each of the cylinders 2 via an exhaust manifold 41. Burnt gas generated within each of the combustion chambers 6 is discharged to the outside through the exhaust port 10, the exhaust manifold 41, and the exhaust passage 40. An upstream catalyst converter 42, and a downstream catalyst converter 43 are respectively provided on an upstream side and a downstream side of the exhaust passage 40 in a flow direction of exhaust gas. A three-element catalyst 421 and a gasoline particulate filter (GPF) 422 are provided on the upstream catalyst converter 42. The three-element catalyst 421 traps harmful components (HC, CO, and NOx) contained in exhaust gas flowing through the exhaust passage 40. The GPF 422 traps particulate materials represented by soot, which is contained in exhaust gas. The downstream catalyst converter 43 is a catalyst converter in which an appropriate catalyst such as a three-element catalyst and an NOx catalyst is held.

A linear $O_2$ sensor SN9 for detecting a concentration of oxygen contained in exhaust gas is disposed at an upstream portion of the exhaust passage 40 with respect to the upstream catalyst converter 42. The linear sensor $O_2$ sensor SN9 is a sensor in which an output value linearly changes according to a level of oxygen concentration, and is able to estimate an air-fuel ratio of fuel-air mixture, based on the output value. Further, an NOx sensor SN10 for measuring an NOx concentration within exhaust gas is disposed between the three-element catalyst 421 and the GPF 422.

The external EGR device 45 includes the EGR passage 451 for connecting the exhaust passage 40 and the intake passage 30, and an EGR cooler 452 and an EGR valve 453 provided in the EGR passage 451. The EGR passage 451 connects a downstream portion of the exhaust passage 40 with respect to the upstream catalyst converter 42, and a portion between the throttle valve 32 and the supercharger 33 in the intake passage 30 to each other. The EGR cooler 452 cools, by heat exchange, exhaust gas (external EGR gas) that returns to the intake passage 30 from the exhaust passage 40 through the EGR passage 451. The EGR valve 453 is disposed in the EGR passage 451 on a downstream side with respect to the EGR cooler 452, and adjusts a flow rate of exhaust gas flowing through the EGR passage 451.

[Control System]

Figure 4:
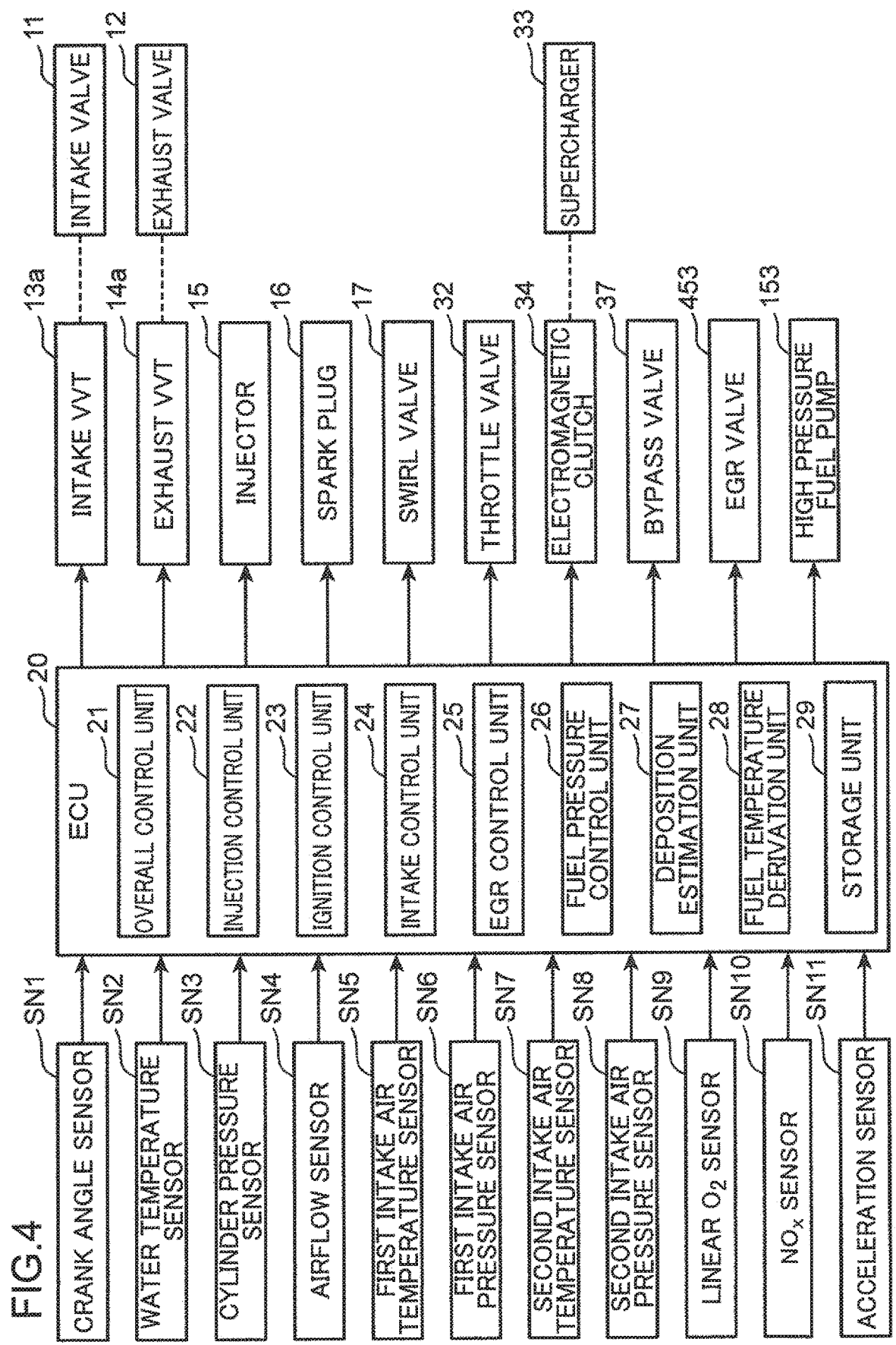
FIG. 4 is a block diagram illustrating a control system of the engine.

Next, a control system of the engine is described. FIG. 4 is a block diagram illustrating a control system of the engine. The control system includes an ECU 20 (a controller constituted of a circuitry). The ECU 20 is a microprocessor for integrally controlling the engine, and is constituted of a known CPU, ROM, RAM, and the like.

Detection signals from various sensors are input to the ECU 20. The ECU 20 is electrically connected to the crank angle sensor SN1, the water temperature SN2, the cylinder pressure sensor SN3, the airflow sensor SN4, the first and second intake air temperature sensors SN5 and SN7, the first and second intake air pressure sensors SN6 and SN8, the linear $O_2$ sensor SN9, and the NOx sensor SN10. The ECU 20 successively receives information detected by these sensors (i.e. a crank angle, an engine rotation speed, an engine water temperature, a cylinder pressure, an intake air flow rate, an intake air temperature, an intake air pressure, an oxygen concentration of exhaust gas, an NOx concentration, and the like). Further, an acceleration sensor SN11 for detecting an opening angle of an unillustrated acceleration pedal is provided in the vehicle. The ECU 20 also receives a detection signal from the acceleration sensor SN11.

The ECU 20 controls each part of the engine, while executing various determinations, calculations, and the like, based on input information from each of the sensors. Specifically, the ECU 20 is electrically connected to the intake VVT 13a, the exhaust VVT 14a, the injector 15, the spark plug 16, the swirl valve 17, the throttle valve 32, the electromagnetic clutch 34, the bypass valve 37, the EGR valve 453, the high pressure fuel pump 153 and the like. The ECU 20 outputs, to these equipment, a signal for controlling each of these equipment, based on a result of the calculations and the like.

The ECU 20 operates in such a way that the ECU 20 functionally includes an overall control unit 21, an injection control unit 22, an ignition control unit 23, an intake control unit 24, an EGR control unit 25, a fuel pressure control unit 26, a deposition estimation unit 27, a fuel temperature derivation unit 28, and a storage unit 29 by causing the ECU 20 to execute a predetermined program.

The overall control unit 21 integrally controls the control units 22 to 26, the deposition estimation unit 27, and the fuel temperature derivation unit 28 of the ECU 20 according to an operating condition and the like of the engine, and causes these units to perform required calculation and control.

The injection control unit 22 is a control module for controlling a fuel injection operation by the injector 15. The ignition control unit 23 is a control module for controlling an ignition operation by the spark plug 16. The intake control unit 24 is a control module for adjusting a flow rate and a pressure of intake air to be introduced to the combustion chamber 6, and controls an opening angle of each of the throttle valve 32 and the bypass valve 37, and ON/OFF of the electromagnetic clutch 34. The EGR control unit 25 is a control module for adjusting an amount of EGR gas to be introduced to the combustion chamber 6, and controls an operation of each of the intake VVT 13a and the exhaust VVT 14a, and an opening angle of the EGR valve 453.

The injection control unit 22 and the intake control unit 24 are able to set an air-fuel ratio of a fuel-air mixture to be generated in the combustion chamber 6 equal to or leaner than a theoretical air-fuel ratio, based on an operating condition of the engine. Further, the injection control unit 22 outputs a control signal to the injector 15 in such a way as to drive the injector 15, based on the set air-fuel ratio.

The fuel pressure control unit 26 adjusts a fuel pressure of fuel to be supplied to the injector 15 by controlling output of the high pressure fuel pump 153. The fuel pressure control unit 26 outputs a predetermined control signal to the high pressure fuel pump 153 by referring to basic fuel pressure maps (FIGS. 6 and 7), which are determined in advance according to an operating condition of the engine (an engine load and an engine rotation speed), and a combustion pattern; and sets the fuel pressure. Further, when a deposition amount of deposits on the injection holes 15B of the injector 15 exceeds a predetermined value, the fuel pressure control unit 26 sets the fuel pressure by referring to a deposition removal map (FIG. 8) so as to perform a cleaning mode of removing deposits. In the cleaning mode, the fuel pressure control unit 26 outputs a control signal to the high pressure fuel pump 153 in such a way that the fuel pressure is increased in a specific operation range. By the fuel pressure increase, an operation of peeling or scraping off deposits deposited on inner surfaces or vicinities of the injection holes 15B is performed by injected fuel.

The deposition estimation unit 27 performs processing of estimating a deposition amount of deposits on the injection holes 15B, based on an operating condition of the engine. The deposition estimation unit 27 acquires a unit deposition amount, which is a deposition amount of deposits per unit time (e.g. 100 ms), according to an operating condition, and acquires a deposition amount of deposits by integrating the unit deposition amount. The fuel pressure control unit 26 performs the cleaning mode, when a deposition of deposits estimated by the deposition estimation unit 27 exceeds a predetermined value.

A deposition amount of deposits is basically determined by an operation time of the engine. However, the unit deposition amount changes depending on a fuel injection timing, a fuel pressure, an injection amount and the like of the injector 15. For example, when a fuel injection timing is set to a time when the piston 5 is near a top dead center, flowing back of injected fuel from the cavity 51 may occur. A spray of the flowing-back fuel adheres to the vicinity of the injection hole 15B, which causes deposition of deposits. Conversely, when a fuel injection timing is set to a time when the piston 5 is near a bottom dead center, flowing-back of the fuel does not substantially occur. Therefore, it is appropriate to derive the unit deposition amount by correcting in such a way as to eliminate an amount of adhesion of flowing-back fuel.

Further, in an operation range in which a fuel pressure is set high in the engine body 1, since fuel is injected at a high pressure from the injection holes 15B, deposition of deposits is less likely to occur. On the other hand, when a high fuel pressure is set, deposits deposited on the injection holes 15B are naturally removed, and it is appropriate to correct the unit deposition amount, taking into consideration an amount corresponding to recovery to an original state (an amount of deposits that have already been removed). Further, in an operation range in which a fuel injection amount is set large in the engine body 1, since a large amount of fuel is injected from the injection holes 15B, deposition of deposits is less likely to occur. Conversely, in an operation range in which a fuel injection amount is set small, deposits are likely to be deposited. Therefore, it is appropriate to correct the unit deposition amount in an offset manner in such a way as to adjust a deposition amount of deposits according to a fuel injection amount. Taking into consideration the above, it is desirable that the deposition estimation unit 27 performs integration after correcting each of the unit integration amounts according to a fuel injection timing, a fuel pressure, an injection amount and the like of the injector 15.

The fuel temperature derivation unit 28 performs processing of acquiring a temperature of fuel to be supplied to the combustion chamber 6. Specifically, the fuel temperature derivation unit 28 performs processing of estimating a fuel temperature, from an intake air temperature to be detected by the second intake air temperature sensor SN7, and an engine water temperature to be detected by the water temperature sensor SN2. For example, a thermometer may be installed on the fuel rail 154 to measure a fuel temperature, and a measured value of the temperature may be input to the fuel temperature derivation unit 28. When a fuel temperature is higher than a predetermined value, a fuel pressure increase by the cleaning mode is avoided. This is performed in order to prevent a drawback such that a fuel pressure increase in a high-temperature state of fuel further increases the fuel temperature, and bubbles may be generated in the fuel.

The storage unit 29 stores various programs, setting values, parameters, and the like for controlling the engine. In addition, the storage unit 29 stores operation maps illustrated in FIGS. 5A to 5C, the basic fuel pressure maps illustrated in FIGS. 8 and 9, the deposition removal map illustrated in FIG. 10, and the like.

[Operation Map]

Figure 5A:
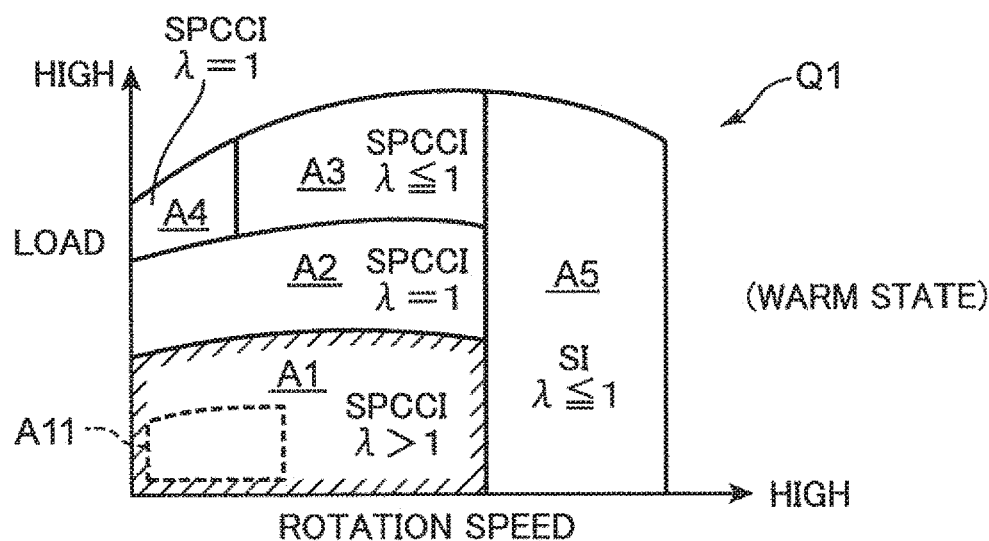
FIGS. 5A to 5C are operation maps in which operation ranges of the engine are classified according to a difference of a combustion pattern.
Figure 5B:
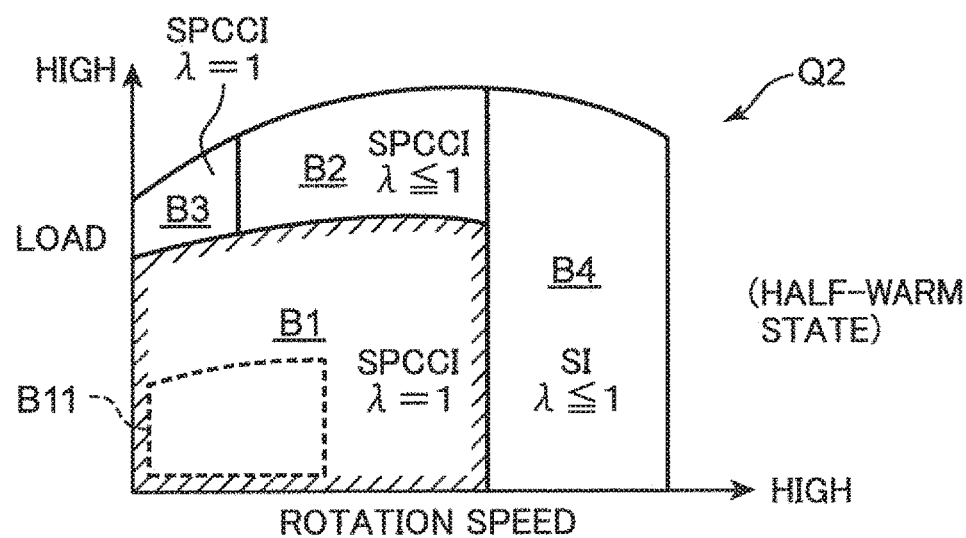
Figure 5C:
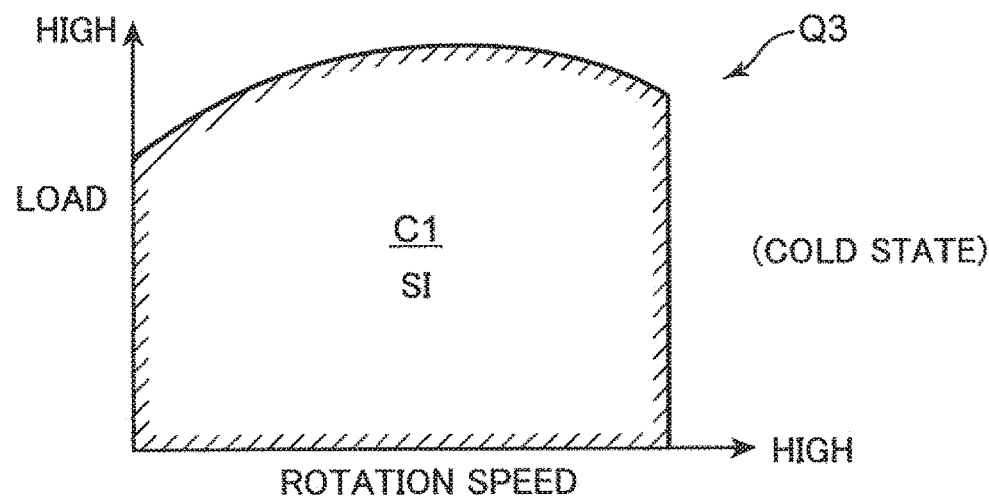

FIGS. 5A to 5C are operation maps in which operation ranges of the engine are classified according to a difference of a combustion pattern. FIGS. 5A to 5C illustrate a difference of combustion control according to a degree of progress of warming up of the engine, and an engine rotation speed/engine load. In the present embodiment, a first operation map Q1 (FIG. 5A) for use in a warm state when warming up of the engine is completed; a second operation map Q2 (FIG. 5B) for use in a half-warm state when warming up of the engine is in progress, and a third operation map Q3 (FIG. 5C) for use in a cold state when the engine is not yet warmed up are prepared. The first operation map Q1 in a warm state includes a first region A1, a second region A2, a third region A3, a fourth region A4, and a fifth region A5, each of which has a different combustion pattern. The second operation map Q2 in a half-warm state includes a sixth region B1, a seventh region B2, an eighth region B3, and a ninth region B4, each of which has a different combustion pattern. The third operation map Q3 in a cold state is constituted of one region, namely, a tenth region C1.

<Warm State>

In the first operation map Q1, the first region A1 is a low to middle speed and low load range, which is acquired by eliminating a part of a high speed range from a low load range in which an engine load is low (including no load). The second region A2 is a low to middle speed and middle load range in which the load is high, as compared with the first region A1. The fourth region A4 is a low speed and high load range in which the load is high and the rotation speed is low, as compared with the second region A2. The third region A3 is a middle speed and high load range in which the rotation speed is high, as compared with the fourth region A4. The fifth region A5 is a high speed range in which the rotation speed is high, as compared with all of the first to fourth regions A1 to A4.

In the first region A1, partial compression ignition combustion (hereinafter, referred to as SPCCI combustion) in which SI combustion and CI combustion are combined is performed. SI combustion is a combustion pattern in which fuel-air mixture is ignited by sparks generated from the spark plug 16, and the fuel-air mixture is forcibly combusted by flame propagation such that a combustion area spreads from the ignition point to the periphery. CI combustion is a combustion pattern in which fuel-air mixture is combusted by self-ignition in a sufficiently high-temperature and high-pressurized environment by compression of the piston 5. SPCCI combustion in which SI combustion and CI combustion are combined is a combustion pattern in which a part of fuel-air mixture within the combustion chamber 6 is subjected to SI combustion by spark ignition to be performed in an environment immediately before the fuel-air mixture is self-ignited, and after the SI combustion (after a further increase in temperature and pressure accompanied by the SI combustion), the other part of the fuel-air mixture within the combustion chamber 6 is subjected to CI combustion by self-ignition. "SPCCI" is abbreviation of Spark Controlled Compression Ignition.

SPCCI combustion has a property such that heat generation in CI combustion becomes sharp, as compared with heat generation in SI combustion. A waveform indicating a heat generation rate by SPCCI combustion is such that a rising inclination at an initial stage of combustion, which is associated with SI combustion, is small, as compared with a rising inclination, which occurs in association with CI combustion thereafter. When a temperature and a pressure within the combustion chamber 6 increase by SI combustion, unburnt fuel-air mixture is self-ignited accompanied by the increase, and CI combustion is started. After CI combustion is started, SI combustion and CI combustion are performed in parallel. Since a combustion speed of fuel-air mixture is fast in CI combustion, as compared with SI combustion, a heat generation rate in CI combustion relatively increases. However, since CI combustion is performed after the piston 5 reaches a compression top dead center, there is no likelihood that an inclination of the waveform indicating the heat generation rate excessively increases. Specifically, after the piston 5 passes the compression top dead center, a motoring pressure is lowered by lowering of the piston 5. This suppresses an increase in heat generation rate. Consequently, an excessive increase in heat generation rate when CI combustion is performed is avoided. In this way, in view of a property such that CI combustion is performed after SI combustion in SPCCI combustion, it is less likely that a heat generation rate being an index of combustion noise excessively increases, and it is possible to suppress combustion noise, as compared with a case that CI combustion is solely performed (a case that an entire amount of fuel is subjected to CI combustion).

Accompanied by completion of CI combustion, SPCCI combustion also finishes. Since a combustion speed is fast in CI combustion, as compared with SI combustion, it is possible to expedite a combustion termination timing, as compared with a case that SI combustion is solely performed (a case that an entire amount of fuel is subjected to SI combustion). Therefore, in SPCCI combustion, it is possible to make a fuel termination timing closer to a compression top dead center in an expansion stroke. This enables to improve fuel efficiency in SPCCI combustion, as compared with a case that SI combustion is solely performed.

In the first region A1, SPCCI combustion described above is performed in a lean environment (SPCCI_$\lambda$>1). Specifically, an opening angle of the throttle valve 32 is set to an opening angle at which an amount of air larger than an amount of air equivalent to a theoretical air-fuel ratio is introduced to the combustion chamber 6 through the intake passage 30. Specifically, the ECU 20 performs control of combusting air-fuel mixture within the combustion chamber 6 by SPCCI combustion in a state that an air-fuel ratio (A/F) being a weight ratio between air (fresh air) to be introduced to the combustion chamber 6 through the intake passage 30, and fuel to be injected to the combustion chamber 6 by the injector 15 becomes larger than a theoretical air-fuel ratio (14.7).

In a major part of the first region A1, internal EGR in which burnt gas is allowed to remain within the combustion chamber 6 is performed. The ECU 20 controls the intake VVT 13a and the exhaust VVT 14a to drive the intake valve 11 and the exhaust valve 12 in such a way as to form a valve overlap period during which both of the intake valve 11 and the exhaust valve 12 are opened, with an exhaust top dead center being interposed, and opens the exhaust valve 12 until the piston 5 passes the exhaust top dead center (until an initial stage of an intake stroke). Thus, burnt gas is drawn back from the exhaust port 10 into the combustion chamber 6, and internal EGR is achieved. A valve overlap period is set in such a way that a cylinder temperature appropriate for acquiring a desired waveform of SPCCI combustion is achieved.

In the second region A2, control is performed in which a fuel-air mixture is subjected to SPCCI combustion in an environment in which an air-fuel ratio within the combustion chamber 6 substantially coincides with a theoretical air-fuel ratio (SPCCI_$\lambda$=1). An opening angle of the throttle valve 32 is set to an opening angle at which an amount of air equivalent to a theoretical air-fuel ratio is introduced to the combustion chamber 6 through the intake passage 30. In the second region A2, the EGR valve 453 is opened, and external EGR gas is introduced to the combustion chamber 6. In view of the above, in the second region A2, a gas air-fuel ratio (G/F) being a weight ratio between total gas and fuel within the combustion chamber 6 becomes larger than the theoretical air-fuel ratio (14.7). Therefore, when the engine is operated in the second region A2, control is performed in which a fuel-air mixture is subjected to SPCCI combustion, while forming a G/F lean environment in which G/F is larger than the theoretical air-fuel ratio, and the A/F substantially coincides with the theoretical air-fuel ratio. An opening angle of the EGR valve 453 is set to an opening angle at which the theoretical air-fuel ratio is achieved on the basis of the A/F.

In the third region A3, control is performed in which a fuel-air mixture is subjected to SPCCI combustion in an environment in which the A/F within the combustion chamber 6 is slightly larger than the theoretical air-fuel ratio (SPCCI_$\lambda$≤1). Since a fuel injection amount appropriate for a middle speed and high load range is necessary, a fuel rich environment is set. On the other hand, in the fourth region A4 in which the engine is in a low speed operation range, although the load is high, control is performed in which a fuel-air mixture is subjected to SPCCI combustion in an environment in which the A/F substantially coincides with the theoretical air-fuel ratio (SPCCI_$\lambda$=1). In the fifth region A5, a relatively ordinary SI combustion is performed. The A/F is set to a value equal to or slightly higher than the theoretical air-fuel ratio (SI_$\lambda$≤1). In all the regions A1 to A5, it is possible to adjust the A/F by an opening angle of the EGR valve 453.

<Half-Warm State>

In the second operation map Q2 in a half-warm state, the sixth region B1 is associated with a region formed by combining the first region A1 and the second region A2 in the first operation map Q1. The seventh region B2, the eighth region B3, and the ninth region B4 are respectively associated with the third region A3, the fourth region A4, and the fifth region A5 in the first operation map Q1.

In the sixth region B1, similarly to the second region A2 in the first operation map Q1, control is performed in which a fuel-air mixture is subjected to SPCCI combustion in an environment in which the A/F within the combustion chamber 6 substantially coincides with the theoretical air-fuel ratio (SPCCI_$\lambda$=1). In at least a part of the sixth region B1, a valve overlap period is set, and internal EGR in which burnt gas is allowed to remain within the combustion chamber 6 is performed. The supercharger 33 is brought to an ON-state in a relatively high load range and a relatively high speed range in the sixth region B1, and is brought to an OFF-state in a range other than the above in the sixth region B1.

In the seventh region B2, the eighth region B3, and the ninth region B4, controls similar to the controls in the third region A3, the fourth region A4, and the fifth region A5 of the first operation map Q1 are respectively performed. Specifically, in the seventh region B2, a fuel-air mixture is subjected to SPCCI combustion in an environment in which the A/F within the combustion chamber 6 is slightly larger than the theoretical air-fuel ratio (SPCCI_$\lambda$≤1). In the eighth region B3, a fuel-air mixture is subjected to SPCCI combustion in an environment in which the A/F substantially coincides with the theoretical air-fuel ratio (SPCCI_λ=1). In the ninth region B4, ordinary SI combustion is performed, and the A/F is set to a value equal to or slightly larger than the theoretical air-fuel ratio (SI_λ≤1).

<Cold State>

The third operation map Q3 in a cold state is constituted only of the tenth region C1. In the tenth region C1, control is performed in which fuel injected mainly in an intake stroke is subjected to SI combustion, while mixing the fuel with air. The control in the tenth region C1 is similar to combustion control of a general gasoline engine.

FIGS. 5A and 5B illustrate specific regions A11 and B11, which are ranges in which the deposition estimation unit 27 corrects a unit deposition amount of deposits according to a fuel injection timing (a position of the piston 5). In the first region A1 where SPCCI_λ>1 combustion is performed, 3-times split intake injection in which a desired amount of fuel is injected three times in a split manner in an intake stroke is employed. However, when requested torque is smaller than a predetermined threshold value, third-time injection is performed at a timing when the piston 5 is near a top dead center in a compression stroke. In other words, in this state, deposits are relatively likely to be deposited. Such a pattern change is performed in the specific region A11, which is a low load and low speed range of the first region A1. Further, in the sixth region B1 where SPCCI_λ=1 combustion is performed, a pattern in which a desired amount of fuel is injected in a batch manner in an intake stroke is a basic pattern, and in a predetermined low load range, a part of fuel is injected at a timing when the piston 5 is near a top dead center in a compression stroke. In other words, in this state, deposits are relatively likely to be deposited. Such a pattern change is performed in the specific region B11, which is a low load and low speed range of the sixth region B1. Therefore, the deposition estimation unit 27 corrects in such a way that the unit deposition amount of deposits relatively increases in the specific regions A11 and B11, as compared with the other operation ranges.

[Specific Example of Fuel Pressure Map]

As described above, the fuel pressure control unit 26 sets a fuel pressure of fuel to be supplied to the injector 15 according to an operating condition. When a fuel pressure is set, the fuel pressure control unit 26 accesses to the storage unit 29, and refers to a fuel pressure map in which a fuel pressure setting value is determined in advance in association with each of an engine load (fuel injection amount) and an engine rotation speed. Further, the fuel pressure control unit 26 reads, from the fuel pressure map, a fuel pressure value associated with a current engine load and a current engine rotation speed, and sets a determined fuel pressure by controlling the high pressure fuel pump 153.

FIG. 6 is one example of a basic fuel pressure map for use in setting a fuel pressure of the injector 15, when SI combustion and SPCCI_λ=1 combustion are performed. A vertical axis in FIG. 8 denotes an engine load, and a horizontal axis in FIG. 6 denotes an engine rotation speed (rpm). A unit of fuel pressure is MPa. Roughly speaking, in a low to middle load range, a fuel pressure is set low (40 MPa) in a low engine rotation speed range, and a fuel pressure is set high (60 MPa) in a high speed range. On the other hand, in a middle to high load range, a fuel pressure is relatively suppressed (30 MPa in a low speed range, and 40 MPa in a high speed range). This is performed in order to avoid lowering of fuel efficiency resulting from an increase in mechanical load by the high pressure fuel pump 153. As described above, since the high pressure fuel pump 153 is driven by a camshaft for driving the exhaust valve 12, the high pressure fuel pump 153 becomes accessory loss for the engine body 1. In view of the above, accessory loss is suppressed by setting a fuel pressure low in a middle to high load range.

FIG. 7 is one example of a basic fuel pressure map for use in setting a fuel pressure of the injector 15, when SPCCI_λ>1 combustion is performed. A vertical axis in FIG. 7 denotes a fuel injection amount (mg) associated with an engine load, and a horizontal axis in FIG. 7 denotes an engine rotation speed (rpm). A unit of fuel pressure is MPa. In the SPCCI_λ>1 combustion, a fuel pressure is set to 40 MPa, irrespective of an engine load and an engine rotation speed. This is because it is not necessary to increase a fuel pressure by intentionally increasing accessory loss in view of that a fuel injection amount is small in lean combustion, and as described above, fuel injection is performed three times in a split manner.

FIG. 8 is one example of a fuel pressure map for deposition removal, which is used in performing a cleaning mode of the injector 15, when SI combustion and SPCCI_λ=1 combustion are performed. As described above, when a deposition amount of deposits on the injection holes 15B of the injector 15 exceeds a predetermined value, the fuel pressure control unit 26 performs a cleaning mode of removing the deposits. In the cleaning mode, deposits deposited on the vicinities of the injection holes 15B are scraped off by an injection pressure of fuel from the injection holes 15B by increasing a fuel pressure. When the cleaning mode is performed, the fuel pressure control unit 26 sets a fuel pressure of the injector 15 by switching a fuel pressure map to be referred to from the basic fuel pressure map illustrated in FIG. 6 to the fuel pressure map for deposition removal exemplified in FIG. 8.

In the fuel pressure map for deposition removal in FIG. 8, when the engine is operated in a low to middle load range (0.125 to 0.35/0.45), and in a low engine rotation speed range (500 to 3000 rpm), a fuel pressure is set to 60 MPa from 40 MPa in the basic fuel pressure map. In other words, in the operation range, a fuel pressure is increased, when the cleaning mode is performed. By such a fuel pressure increase, deposits in the vicinities of the injection holes 15B are removed.

[Case Where Fuel Pressure Increase is Restricted]

As described above, the fuel pressure control unit 26 increases a fuel pressure by applying the fuel pressure map for deposition removal, when a deposition amount of deposits on the injection holes 15B exceeds a predetermined value; and performs a cleaning mode. However, a fuel pressure increase is restricted in a predetermined condition. Roughly speaking, as fuel pressure increase restriction patterns, there are two cases:

(A) a cleaning mode itself, to which the fuel pressure map for deposition removal is applied, is restricted; and (B) although the fuel pressure map for deposition removal is applied, a range in which a fuel pressure increase is restricted is set in the map.

In the present embodiment, as specific examples of the case (A), (A1) a case where lean combustion is performed, and (A2) a case where a fuel temperature is high are exemplified.

Further, as specific examples of the case (B), (B1) a case where an engine load is in a high load range, and (B2) a case where an engine rotation speed is in a high speed range are exemplified.

The "restriction" of a fuel pressure increase includes, in addition to completely inhibiting a fuel pressure increase, "suppression" of a degree of fuel pressure increase with respect to an ordinary degree of fuel pressure increase in the cleaning mode. In the cases (A1) and (A2), in a case of "inhibition", even when a deposition amount of deposits exceeds a predetermined value, shifting to the cleaning mode, in other words, application of the fuel pressure map for deposition removal itself is inhibited. As an example of "suppression", it is possible to apply a fuel pressure map for deposition removal for use in "suppression" in which a degree of fuel pressure increase is set low, as compared with an ordinary fuel pressure map for deposition removal. In the cases of (B1) and (B2), as an example of "inhibition", it is possible to set a fuel pressure to be completely equal to a fuel pressure in the basic fuel pressure map in a predetermined operation range of the fuel pressure map for deposition removal. Further, as an example of "suppression", it is possible to set a degree of fuel pressure increase in the predetermined operation range smaller than a value in the ordinary fuel pressure map for deposition removal.

<A1: Restriction when Lean Combustion is Performed>

The fuel pressure control unit 26 restricts the fuel pressure increase, when an air-fuel ratio of a fuel-air mixture to be generated within the combustion chamber is set leaner than a theoretical air-fuel ratio, even when an estimated deposition amount of deposits exceeds a predetermined value. In the present embodiment, in the first region A1 in FIG. 5A, SPCCI_λ>1 combustion in which an air-fuel ratio is set leaner than a theoretical air-fuel ratio is performed. When SPCCI_λ>1 combustion is performed, the fuel pressure control unit 26 inhibits or suppresses a fuel pressure increase for the cleaning mode. This is because increasing a fuel pressure of the injector 15 in a condition that combustion such as SPCCI_λ>1 combustion is performed by generating a lean fuel-air mixture may cause a tendency that it is not possible to secure linearity of a fuel injection amount from the injector 15. This point is described with reference to FIGS. 9A and 9B.

The fuel pressure control unit 26 causes the injector 15 to perform an injection operation by applying a control pulse having a pulse width associated with an opening period of the injection holes 15B. The injector 15 is driven by applying pulse-controlled electric current to an internal coil for operating a valve body that opens and closes the injection holes 15B. A fuel injection amount from the injection holes 15B is adjusted by a pulse width of a control pulse (a period during which the injection holes 15B are opened).

Figure 9A:
FIGS. 9A and 9B are time charts illustrating an example of a pulse width of a control pulse for the injector.
Figure 9B:
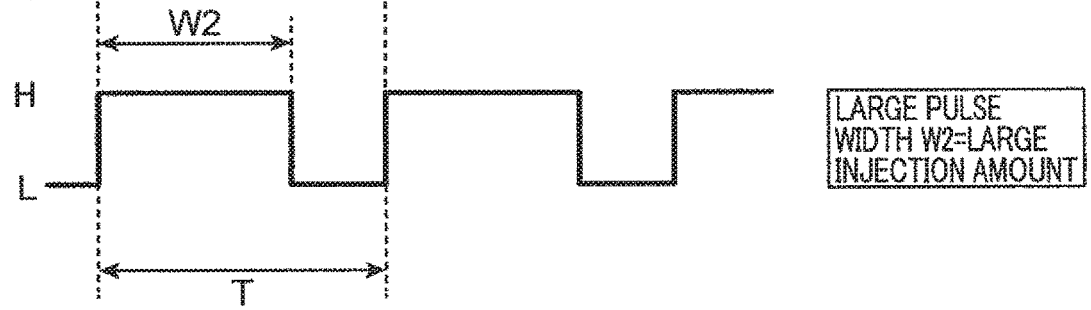

FIGS. 9A and 9B are time charts illustrating an example of pulse widths W1 and W2 of a control pulse for the injector 15. FIG. 9A illustrates a control pulse having a small duty ratio, specifically, a control pulse having a relatively short pulse width W1 associated with a pulse high period "H" with respect to a pulse period T. When a control pulse having the small pulse width W1 is applied to the injector 15, a fuel injection amount decreases, because an opening period of the injection holes 15B is shortened. On the other hand, FIG. 9B illustrates a control pulse having a large duty ratio, specifically, a control pulse having a relatively large pulse width W2 with respect to a pulse period T. When a control pulse having the large pulse width W2 is applied, a fuel injection amount increases, because an opening period of the injection holes 15B increases.

Figure 9C:
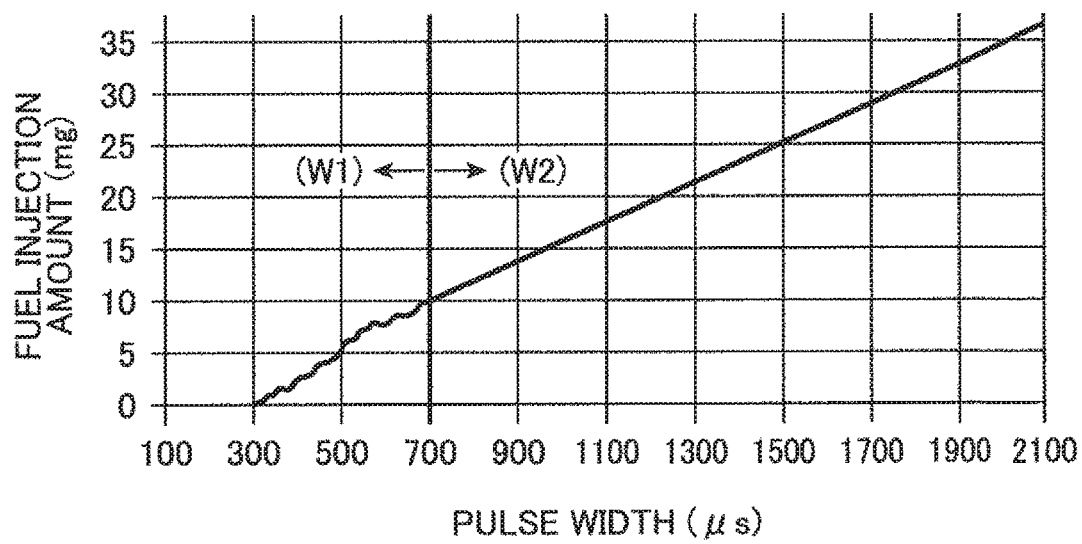
FIG. 9C is a graph illustrating a relationship between a pulse width and a fuel injection amount.

FIG. 9C is a graph illustrating one example of a relationship between a pulse width of a control pulse for the injector 15, and a fuel injection amount. As a characteristic of a general-purpose injector 15, linearity of a fuel injection amount is lowered in a range in which a pulse width of a control pulse is too small. In other words, there is a tendency that an opening period of the injection holes 15B and an injection amount are not proportional to each other. In the graph of FIG. 9C, in a range in which the pulse width is equal to or larger than 700 μs, a fuel injection amount linearly increases with respect to a pulse width increase, and linearity between these two parameters is high. However, in a range in which the pulse width is smaller than 700 μs, a fuel injection amount does not linearly increase with respect to a pulse width increase, and fluctuation is present in the graph. Roughly speaking, it can be said that a range in which the pulse width is smaller than 700 μs is a range in which the small pulse width W1 illustrated in FIG. 9A is present, and a range in which the pulse width is equal to or larger than 700 μs is a range in which the large pulse width W2 illustrated in FIG. 9B is present.

When lean combustion is performed, since a fuel injection amount from the injector 15 is relatively small, the pulse width is set to a relatively small value. In this condition, increasing a fuel pressure increases an injection amount per unit time. In view of the above, it is necessary to further shorten an opening period of the injection holes 15B by further decreasing the pulse width, which is originally set to a small value. As illustrated in FIG. 9C, in a range in which the pulse width is too small, linearity of a fuel injection amount is lowered, and there is a tendency that an opening period of the injection holes 15B and an injection amount are not proportional to each other. When the linearity is lowered, an intended fuel-air mixture distribution cannot be secured in the combustion chamber 6, and combustion stability may be lowered.

In particular, in the present embodiment, in the first region A1 where SPCCI_λ>1 combustion is applied, 3-times split intake injection is employed. Specifically, since fuel of an amount necessary for achieving target torque is injected three times in a split manner, a pulse width per injection is originally small. Therefore, increasing a fuel pressure when SPCCI_λ>1 combustion is performed may lower combustion stability. In view of the above, it is desirable to set a configuration in which the cleaning mode is in inhibited, when SPCCI_λ>1 combustion is performed, or a configuration in which at least a fuel pressure increase is suppressed. Taking into consideration the above, in the present embodiment, a fuel pressure map for deposition removal when SPCCI_λ>1 combustion is performed is not prepared. Inhibiting the cleaning mode when SPCCI_λ>1 combustion is performed enables to suppress fluctuation of a fuel-air mixture distribution within a cylinder, and secure combustion stability.

<A2: Restriction when Fuel Temperature is High>

When a fuel temperature derived by the fuel temperature derivation unit 28 is a temperature higher than a predetermined reference temperature, the fuel pressure control unit 26 restricts a fuel pressure from increasing. When a temperature of fuel to be supplied from the fuel supply system 150 is excessively increased due to a high-temperature state of the engine body 1 and the like, bubbles may be generated in the fuel. When the bubbles intrude into the injector 15, an injection amount associated with a fuel pressure and an opening period of the injection holes 15B may not be injected (hereinafter, this phenomenon is referred to as a "fuel failure"). When a fuel failure occurs, it is not possible to secure combustion stability.

As a fuel pressure is increased by the high pressure fuel pump 153, a fuel temperature also tends to increase. When a fuel pressure is increased in order to perform the cleaning mode in a state that a fuel temperature has already increased, the fuel temperature may be further increased, which may promote occurrence of a fuel failure. Therefore, when a fuel temperature is higher than a predetermined threshold value, and a further fuel pressure increase may increase a possibility of occurrence of a fuel failure, even when a deposition amount of deposits exceeds a predetermined value, the fuel pressure control unit 26 is inhibited or suppressed from performing the cleaning mode. Thus, it is possible to suppress a fuel failure, and secure combustion stability.

<B1: Restriction in High Load Range>

In classifying an engine load range into a high load range in which the load is relatively high, and a low load range in which the load is relatively low, the fuel pressure control unit 26 restricts a fuel pressure from increasing, when an engine load is in the high load range. Since the high pressure fuel pump 153 operates by receiving a mechanical driving force from the engine body 1, a fuel pressure increase increases a machine load (accessory loss) of the engine body 1. Generally, when the engine load is high, a fuel pressure of the injector 15 is set high in order to increase a fuel injection amount per unit time. In such a high load state, further increasing a fuel pressure in order to perform the cleaning mode further increases a machine load by the high pressure fuel pump 15, and consequently, fuel efficiency may be lowered.

Further, in a high load range in which a fuel pressure is originally set high and/or a fuel injection amount is set large, cleaning effects of deposits adhered to the injection holes 15B can be expected. In other words, in a high load range, a fuel pressure is high, and a fuel injection amount per unit time is large, and it can be said that a cleaning operation of removing deposits is naturally performed. Therefore, the fuel pressure control unit 26 restricts a fuel pressure from increasing for deposition removal in at least a part of a high load range (in a predetermined range of the basic fuel pressure map). Thus, it is possible to avoid an unnecessary increase of a mechanical driving resistance by the high pressure fuel pump 153.

In the fuel pressure map for deposition removal illustrated in FIG. 8, a fuel pressure for deposition removal is determined in advance according to an engine load. In the fuel pressure map for deposition removal, a fuel pressure is set high in a low load range, as compared with the basic fuel pressure map when SI combustion and SPCCI_$\lambda$=1 combustion illustrated in FIG. 6 are performed, and in the high load range, a fuel pressure is set to be equal to a fuel pressure in the basic fuel pressure map. Specifically, in a high engine load range (0.4/0.8 to 1.4) of the fuel pressure map for deposition removal, a fuel pressure is set to be equal to a fuel pressure in the basic pressure map. Specifically, in a low engine rotation speed range (500 to 2750 rpm) of the high load range, a fuel pressure is kept to 30 MPa, which is the same as in the basic fuel pressure map, and also in a high engine rotation speed range (3000 to 6500 rpm), a fuel pressure is kept to 40 MPa. As described above, in a part of a low to middle load range (0.125 to 0.35/0.45), a fuel pressure is increased, as compared with the basic fuel pressure map.

Further, in the basic fuel pressure map in FIG. 6, a fuel pressure to be set is determined in advance according to an engine load. Let us consider a predetermined range of the basic fuel pressure map, specifically, a range in which an engine load is 0.125 to 0.55/0.7, and an engine rotation speed is 1000 to 3000 rpm. In the predetermined range, a fuel pressure (60 MPa) in a relatively high load range is set high, as compared with a fuel pressure (40 MPa) in a relatively low load range. Further, in the fuel pressure map for deposition removal in FIG. 8, a fuel pressure is kept to 60 MPa in the relatively high load range. This is because a high fuel pressure of 60 MPa at which deposits are removable is already set in the operation range of the basic fuel pressure map, and it is not necessary to increase a fuel pressure any more by increasing accessory loss. Therefore, the fuel pressure control unit 26 inhibits a fuel pressure from increasing, when an engine load is in the high load range in a state that a deposition amount of deposits exceeds a predetermined value.

<B2: Restriction in High Speed Range>

In classifying an engine load range into a high speed range in which a rotation speed is relatively high, and a low speed range in which a rotation speed is relatively low, the fuel pressure control unit 26 restricts a fuel pressure from increasing, when an engine load is in the high speed range. Generally, when an engine rotation speed is high, a total time during which the injection holes 15B are opened is extended, and a fuel injection amount per unit time increases, as compared with a case when an engine rotation speed is low. Therefore, it is possible to remove deposits from the injection holes 15B by injection of a large amount of fuel, without increasing a fuel pressure, and it can be said that a cleaning operation is naturally performed. Nevertheless, increasing a fuel pressure in order to perform a cleaning mode in such a high speed state leads to unnecessarily increasing a machine load by the high pressure fuel pump 153, and consequently, may lower fuel efficiency. Therefore, the fuel pressure control unit 26 restricts a fuel pressure from increasing for deposition removal, when an engine rotation speed is in a high speed range.

In the fuel pressure map for deposition removal illustrated in FIG. 8, it can be said that a fuel pressure for deposition removal is determined in advance according to an engine rotation speed. In the fuel pressure map for deposition removal, a fuel pressure is set high in a part of a low speed range (low load range), as compared with the basic fuel pressure map when SI combustion and SPCCI_$\lambda$=1 combustion illustrated in FIG. 6 are performed, and a fuel pressure is set to be equal to a fuel pressure in the basic fuel pressure map in the high load range. Specifically, in a high speed range (3250 to 6500 rpm) of the fuel pressure map for deposition removal, a fuel pressure is set to be equal to a fuel pressure in the basic fuel pressure map. Specifically, in an operation range (0.125 to 0.7) in which an engine load is relatively low in the high speed range, a fuel pressure is kept to 60 MPa, which is the same as in the basic fuel pressure map, and also in an operation range (0.8 to 1.4) in which an engine load is relatively high, a fuel pressure is kept to 40 MPa. As described above, a fuel pressure is increased in a part of a low speed range (500 to 3000 rpm), as compared with the basic fuel pressure map.

Further, in the basic fuel pressure map of FIG. 6, it can be said that a fuel pressure to be set is determined in advance according to an engine rotation speed. Let us consider a predetermined range of the basic fuel pressure map, specifically, a range in which an engine load is 0.125 to 0.35, and an engine rotation speed is 500 to 6500 rpm. In the predetermined range, a fuel pressure (60 MPa) in a high speed range is set high, as compared with a fuel pressure (40 MPa) in a low speed range. Further, in the fuel pressure map for deposition removal in FIG. 8, a fuel pressure is kept to 60 MPa in the high speed range. This is because, as described above, at a high fuel pressure of 60 MPa, it is possible to remove deposits. Therefore, the fuel pressure control unit 26 inhibits a fuel pressure from increasing, when an engine rotation speed is in the high speed range in a state that a deposition amount of deposits exceeds a predetermined value.

[Fuel Pressure Switching Control Flow]

FIG. 10 is a flowchart illustrating one example of fuel pressure switching control of the injector 15 by the ECU 20 (FIG. 4). The ECU 20 reads various signals from the sensors SN1 to SN11 illustrated in FIG. 4, and other sensors; and acquires information relating to an operating condition of the engine body 1 (Step S1). The ECU 20 specifies in which region of the operation maps Q1 to Q3 illustrated in FIGS. 5A to 5C, a current operation point is located, based on the acquired information.

Subsequently, the deposition estimation unit 27 acquires a unit deposition amount in a current processing cycle according to an operating condition, and performs processing of acquiring a deposition amount of deposits by integrating the unit deposition amount (Step S2). The deposition estimation unit 27 corrects a unit deposition amount of deposits, which is determined by an operation time and an operating condition, by using a coefficient that is determined by a fuel injection timing (a degree of flowing back of a fuel spray from the piston 5), a fuel pressure, and an injection amount; and acquires the unit deposition amount in the processing cycle.

Thereafter, the fuel pressure control unit 26 determines a current operation range (Step S3). For simplification, in this section, a case is described in which determination is made whether the operation range is a range in SI combustion (tenth region C1 in FIG. 5C), a range in SPCCI_$\lambda$=1 combustion (sixth region B1 in FIG. 5B), or a range in SPCCI_$\lambda$>1 combustion (first region A1 in FIG. 5A). When the operation range is not an operation range in which SI combustion or SPCCI_$\lambda$=1 combustion is performed (NO in Step S3), in other words, is an operation range in which SPCCI_$\lambda$>1 combustion is performed, the fuel pressure control unit 26 sets a fuel pressure of the injector 15 by referring to a basic fuel pressure map on SPCCI_$\lambda$>1 combustion illustrated in FIG. 10 (Step S4). Specifically, when SPCCI_$\lambda$>1 combustion is performed, as described above, performing a cleaning mode of increasing a fuel pressure is inhibited, taking into consideration a drawback such that linearity of a fuel injection amount may be lowered.

On the other hand, when the operation range is an operation range in which SI combustion or SPCCI_$\lambda$=1 combustion is performed (YES in Step S3), the fuel pressure control unit 26 determines whether the deposition amount of deposits acquired by the deposition estimation unit 27 in Step S2 exceeds a predetermined threshold value Th1 (Step S5). The threshold value Th1 is set to any value before the deposition amount of deposits reaches a deposition amount of deposits at which fuel injection characteristics from the injection holes 15B are deteriorated. When the deposition amount of deposits does not exceed the threshold value Th1 (NO in Step S5), the fuel pressure control unit 26 does not perform a cleaning mode, and sets a fuel pressure of the injector 15 by referring to a basic fuel pressure map on SI combustion and SPCCI_$\lambda$=1 combustion illustrated in FIG. 6 (Step S7).

When the deposition amount of deposits exceeds the threshold value Th1 (YES in Step S5), the fuel pressure control unit 26 refers to, in a current processing cycle, a fuel temperature, which is derived by the fuel temperature derivation unit 28 from a detection value of the second intake air temperature sensor SN7 and a detection value of the water temperature sensor SN2 (Step S6). When the fuel temperature is equal to or higher than a predetermined threshold value Th2 (NO in Step S6), in other words, when the fuel temperature reaches a relatively high temperature, the fuel pressure control unit 26 does not perform a cleaning mode, and sets a fuel pressure of the injector 15 by referring to the basic fuel pressure map on SI combustion and SPCCI_$\lambda$=1 combustion (Step S7). This is because, even in a state that a deposition amount of deposits exceeds the threshold value Th1, increasing a fuel pressure when fuel is in a high temperature state may further raise the fuel temperature, and a fuel failure such as generation of bubbles may occur.

On the other hand, when the fuel temperature is lower than the threshold value Th2 (YES in Step S6), the fuel pressure control unit 26 performs a cleaning mode. Specifically, a fuel pressure map to be referred to is switched from the basic fuel pressure map to the fuel pressure map for deposition removal illustrated in FIG. 8 (Step S8). Thus, when the operation range belongs to a predetermined operation range (low to middle load range), a fuel pressure is increased, as compared with the basic fuel pressure map, and deposits on the vicinities of the injection holes 15B are removed.

[Modifications]

In the foregoing, an embodiment according to the present invention has been described. The present invention, however, is not limited to the above, and the following modified embodiments may be employed, for example.

The embodiment exemplifies a configuration in which a fuel pressure is not increased in a high-speed and high-load operation range of the fuel pressure map for deposition removal in FIG. 8. This is one example. Also in the high-speed and high-load operation range, it is possible to increase a fuel pressure when a cleaning mode is performed.

(2) The embodiment describes an example in which a cleaning mode is not performed when SPCCI_$\lambda$>1 combustion is performed. Alternatively, it is possible to perform a cleaning mode in which a fuel pressure is increased, after lean combustion is shifted to a fuel-rich side by temporarily changing a combustion pattern from SPCCI_$\lambda$>1 combustion to SPCCI_$\lambda$=1 combustion, for example.

(3) The embodiment describes an example in which a cleaning mode is not performed, when a fuel temperature is equal to or higher than the threshold value Th2 (Step S6 in FIG. 10). When a means (such as a cooling device) for eliminating a fuel temperature increase is provided, in other words, when a vehicle is provided with a countermeasure against a fuel temperature increase, it is possible to omit processing of determining a fuel temperature.

The above specific embodiment discloses a combustion chamber structure for an engine having the following configuration.

An engine control device according to one aspect of the present invention is a control device for an engine provided with a fuel injection valve disposed within a combustion chamber, a part of which is defined by a piston including a cavity in a crown surface thereof, and configured to directly inject fuel toward the cavity. The control device includes: a fuel pressure adjustment mechanism for adjusting a fuel pressure of fuel to be supplied to the fuel injection valve; and a controller for controlling the fuel injection valve and the fuel pressure adjustment mechanism, and constituted of a circuitry. The controller is configured to: set an air-fuel ratio of a fuel-air mixture to be generated within the combustion chamber to an air-fuel ratio equal to or leaner than a theoretical air-fuel ratio, based on an operating condition of the engine; output a control signal to the fuel injection valve in such a way as to drive the fuel injection valve, based on the set air-fuel ratio; perform processing of estimating a deposition amount of deposits on an injection hole of the fuel injection valve, based on an operating condition of the engine; output a control signal to the fuel pressure adjustment mechanism in such a way as to increase the fuel pressure, when the estimated deposition amount of deposits exceeds a predetermined value; and restrict the fuel pressure from increasing, even when the estimated deposition amount of deposits exceeds the predetermined value, as long as the set air-fuel ratio is set to an air-fuel ratio leaner than the theoretical air-fuel ratio.

In the control device, when the deposition amount of deposits exceeds the predetermined value, the controller performs processing of increasing the fuel pressure, and removing the deposits. However, as long as the air-fuel ratio is set leaner than the theoretical air-fuel ratio, even when the deposition amount of deposits exceeds the predetermined value, the controller restricts the fuel pressure from increasing. Specifically, in a range in which the pulse width is required to be set small, and linearity of a fuel injection amount cannot be secured, an increase of the fuel pressure is restricted. This enables to suppress fluctuation of a fuel-air mixture distribution within a cylinder, and secure combustion stability.

In the control device, desirably, the controller may inhibit the fuel pressure from increasing, when the air-fuel ratio is set leaner than the theoretical air-fuel ratio. This enables to avoid control of decreasing the pulse width when lean combustion is performed, and prevent fluctuation of the fuel-air mixture distribution.

Alternatively, desirably, the controller may decrease a degree of increase of the fuel pressure, when the air-fuel ratio is set to leaner than the theoretical air-fuel ratio. This enables to restrain a degree by which the pulse width is decreased when lean combustion is performed, and suppress fluctuation of the fuel-air mixture distribution.

In the control device, desirably, the engine may be an engine capable of performing partial compression ignition combustion in which a part of a fuel-air mixture is subjected to SI combustion by spark ignition, and the remaining part of the fuel-air mixture is subjected to CI combustion by self-ignition. The controller may restrict the fuel pressure from increasing, when partial compression ignition combustion is performed in which an air-fuel ratio is set leaner than the theoretical air-fuel ratio.

In the control device, when lean partial compression ignition combustion is performed, control of decreasing the pulse width is suppressed. Lean combustion in partial compression ignition combustion, a large air-fuel ratio may be set, in view of preventing deterioration of emission performance. Further, in partial compression ignition combustion, stratification of a fuel-air mixture may be required in order to achieve a desired heat generation rate in combustion. In this case, a desired amount of fuel per cycle may be injected a plurality of times in a split manner. Then, it is necessary to set the pulse width small. In such lean partial compression ignition combustion, restricting an increase of the fuel pressure enables to avoid a drawback such that an intended fuel-air mixture distribution is not secured.

An engine system according to another aspect of the present invention includes: an engine body including a combustion chamber, a part of which is defined by a piston including a cavity in a crown surface thereof, and a fuel injection valve disposed within the combustion chamber and configured to directly inject fuel toward the cavity; and the above-described control device. A head portion of the fuel injection valve in which the injection hole is formed is disposed on a ceiling surface of the combustion chamber in such a way as to face the cavity in a vicinity of a radial center of the combustion chamber.

In the engine system, the fuel injection valve is of a so-called center injection type in which the fuel injection valve is vertically disposed in such a way as to face the cavity from above the combustion chamber. Since this arrangement is likely to cause flowing back of injected fuel from the cavity, and is likely to cause deposition, performing deposition removal processing by a fuel pressure increase according to control of the above-described control device is more advantageous.

A control method for an engine according to yet another aspect of the present invention is a control method for an engine provided with a combustion chamber, a part of which is defined by a piston including a cavity in a crown surface thereof, a fuel injection valve for directly injecting fuel toward the cavity, and a fuel pressure adjustment mechanism for adjusting a fuel pressure of fuel to be supplied to the fuel injection valve. The control method includes: setting an air-fuel ratio of a fuel-air mixture to be generated within the combustion chamber to an air-fuel ratio equal to or leaner than a theoretical air-fuel ratio, based on an operating condition of the engine; driving the fuel injection valve, based on the set air-fuel ratio; estimating a deposition amount of deposits on an injection hole of the fuel injection valve, based on an operating condition of the engine; causing the fuel pressure adjustment mechanism to increase the fuel pressure, when the estimated deposition amount of deposits exceeds a predetermined value; and restricting the fuel pressure from increasing, even when the estimated deposition amount of deposits exceeds the predetermined value, as long as the set air-fuel ratio is set to an air-fuel ratio leaner than the theoretical air-fuel ratio.

The present invention described above enables to provide an engine control device and an engine control method capable of accurately removing deposits from an injection hole of a fuel injection valve, and securing combustion stability; and an engine system to which the engine control device and the engine control method are applied.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A control device for an engine provided with a fuel injection valve disposed within a combustion chamber, a part of which is defined by a piston including a cavity in a crown surface thereof, and configured to directly inject fuel toward the cavity, the control device comprising:

a fuel pressure adjustment mechanism for adjusting a fuel pressure of fuel to be supplied to the fuel injection valve; and a controller for controlling the fuel injection valve and the fuel pressure adjustment mechanism, and constituted of a circuitry, wherein the controller is configured to:

set an air-fuel ratio of a fuel-air mixture to be generated within the combustion chamber to an air-fuel ratio equal to or leaner than a theoretical air-fuel ratio, based on an operating condition of the engine;

output a control signal to the fuel injection valve in such a way as to drive the fuel injection valve, based on the set air-fuel ratio;

perform processing of estimating a deposition amount of deposits on an injection hole of the fuel injection valve, based on an operating condition of the engine;

output a control signal to the fuel pressure adjustment mechanism in such a way as to increase the fuel pressure, when the estimated deposition amount of deposits exceeds a predetermined value; and restrict the fuel pressure from increasing, even when the estimated deposition amount of deposits exceeds the predetermined value, as long as the set air-fuel ratio is set to an air-fuel ratio leaner than the theoretical air-fuel ratio.

2. The control device for the engine according to claim 1, wherein
the controller inhibits the fuel pressure from increasing, when the air-fuel ratio is set leaner than the theoretical air-fuel ratio.

3. The control device for the engine according to claim 1, wherein
the controller decreases a degree of increase of the fuel pressure, when the air-fuel ratio is set leaner than the theoretical air-fuel ratio.

4. The control device for the engine according to claim 1, wherein
the engine is an engine capable of performing partial compression ignition combustion in which a part of a fuel-air mixture is subjected to SI combustion by spark ignition, and the remaining part of the fuel-air mixture is subjected to CI combustion by self-ignition, and
the controller restricts the fuel pressure from increasing, when partial compression ignition combustion is performed in which an air-fuel ratio is set leaner than the theoretical air-fuel ratio.

5. An engine system comprising:
an engine body including a combustion chamber, a part of which is defined by a piston including a cavity in a crown surface thereof, and a fuel injection valve disposed within the combustion chamber and configured to directly inject fuel toward the cavity; and the control device according to claim 1, wherein
a head portion of the fuel injection valve in which the injection hole is formed is disposed on a ceiling surface of the combustion chamber in such a way as to face the cavity in a vicinity of a radial center of the combustion chamber.

6. A control method for an engine provided with a combustion chamber, a part of which is defined by a piston including a cavity in a crown surface thereof, a fuel injection valve for directly injecting fuel toward the cavity, and a fuel pressure adjustment mechanism for adjusting a fuel pressure of fuel to be supplied to the fuel injection valve, the control method comprising:

setting an air-fuel ratio of a fuel-air mixture to be generated within the combustion chamber to an air-fuel ratio equal to or leaner than a theoretical air-fuel ratio, based on an operating condition of the engine;

driving the fuel injection valve, based on the set air-fuel ratio;

estimating a deposition amount of deposits on an injection hole of the fuel injection valve, based on an operating condition of the engine;

causing the fuel pressure adjustment mechanism to increase the fuel pressure, when the estimated deposition amount of deposits exceeds a predetermined value; and restricting the fuel pressure from increasing, even when the estimated deposition amount of deposits exceeds the predetermined value, as long as the set air-fuel ratio is set to an air-fuel ratio leaner than the theoretical air-fuel ratio.

* * * * *